(12) United States Patent
Okazaki et al.

(10) Patent No.: US 7,798,551 B2
(45) Date of Patent: Sep. 21, 2010

(54) VEHICLE-MOUNTABLE SUN VISOR

(75) Inventors: Yutaka Okazaki, Kanagawa (JP);
Yoshiaki Kazama, Kanagawa (JP);
Akira Kanashiki, Kanagawa (JP)

(73) Assignee: Kasai Kogyo Co., Ltd., Kouza-gun, Kanagawa (JP)

( * ) Notice: Subject to any disclaimer, the term of this patent is extended or adjusted under 35 U.S.C. 154(b) by 0 days.

(21) Appl. No.: 12/379,462

(22) Filed: Feb. 23, 2009

(65) Prior Publication Data

US 2010/0013263 A1    Jan. 21, 2010

(30) Foreign Application Priority Data

Jul. 15, 2008  (JP) .............................. 2008-183718
Jan. 27, 2009  (JP) .............................. 2009-016041
Feb. 6, 2009   (JP) .............................. 2009-025639

(51) Int. Cl.
*B60J 3/00* (2006.01)

(52) U.S. Cl. .................................. 296/97.11; 296/97.12

(58) Field of Classification Search ................ 296/97.9, 296/97.11, 97.12
See application file for complete search history.

(56) References Cited

U.S. PATENT DOCUMENTS

| 6,042,172 A * | 3/2000 | Murdock ................. 296/97.12 |
| 6,131,985 A * | 10/2000 | Twietmeyer et al. ...... 296/97.12 |
| 6,612,637 B1 | 9/2003 | Crotty, III |
| 6,692,059 B1 | 2/2004 | Mills |

2008/0093876 A1    4/2008  Olep et al.

FOREIGN PATENT DOCUMENTS

| JP | 09-254649 | 9/1997 |
| JP | 2004-009883 | 1/2004 |
| JP | 2007-131168 | 5/2007 |
| WO | WO 2006/026269 A2 | 3/2006 |
| WO | WO 2006/026269 A3 | 3/2006 |

OTHER PUBLICATIONS

European Search Report dated Jun. 24, 2009.

* cited by examiner

*Primary Examiner*—Joseph D Pape
(74) *Attorney, Agent, or Firm*—McGinn IP Law Group, PLLC

(57) ABSTRACT

A vehicle-mountable sun visor includes: a shaft of which one end is mounted on a vehicle body; a support, which is mounted on the shaft; a sun visor body in which two resin core members are coupled with each other by a hinged portion and the two resin core members are folded with the hinged portion being a fold so as to involve the other end of the shaft and the support; a first slide guide, which is provided in proximity to the hinged portion, for guiding sliding of the support; and a second slide guide, which is provided on an internal face of one of the two resin core members, for guiding sliding of the support. The support is slidably held in a space surrounded by the folded two resin core members, the first slide guide, and the second slide guide. The support turns around the shaft, and the sun visor body thereby turns. The support slides along the two resin core members, the first slide guide, and the second slide guide, and the sun visor body thereby slides relative to the shaft. In this manner, operability in sliding operation of the vehicle-mountable sun visor is enhanced.

11 Claims, 18 Drawing Sheets

VEHICLE-MOUNTABLE SUN VISOR

CROSS-REFERENCE TO RELATED APPLICATIONS

This application is based upon and claims a priority from the prior Japanese patent Application No. 2008-183718 filed on Jul. 15, 2008, the entire contents of which are incorporated herein by reference.

BACKGROUND OF THE INVENTION

1. Field of the Invention

The present invention relates to a vehicle-mountable sun visor.

2. Description of the Related Art

It is known that a conventional sun visor is mountable to a vehicle driver's seat or a frontally obliquely upward site of an auxiliary seat, and is employed to preclude dazzling due to direct sunlight or headlight of an oncoming vehicle. Recently, it has been known that a vehicle-mountable sun visor is capable of varying a light interruption range in accordance with conditions such as a driver's posture and body type, and is turnable in order to interrupt light such as direct sunlight from a side glass or headlight.

In a conventional vehicle-mountable sun visor described in Patent Document 1, Japanese Laid-open Application Publication Nos. 2004-009883, 9-254649, and 2007-131168, two resin core members are bent to form a sun visor body, and part of a shaft mounted on a vehicle and a support mounted on the shaft are involved in the sun visor body. In this manner, turning and sliding movements of the sun visor can be realized.

DISCLOSURE OF THE INVENTION

Problem(s) to Be Solved by the Invention

Hereinafter, the problem(s) to be solved by the present invention will be described.

FIG. 1 is a schematic view showing an exemplary vehicle-mountable sun visor, according to the present invention. A sun visor 100 is made up of: a sun visor body 20, which interrupts externally irradiated light; a shaft 28, which is mounted on a vehicle body at one end 29; and a support 27. The sun visor body 20 has a hollow structure that two resin core members are constituted in a bent state. The other end of the shaft 28 and the support 27 are involved between the bent resin core members, inside of an end edge taken along the longitudinal direction of the sun visor body 20. A support 27 is held between the bent resin core members in a state in which the assembly is slidable longitudinally of the sun visor body 20.

As indicated by the arrow B in the figure, the support 27 longitudinally slides, whereby the sun visor body 20 can slide relatively to the shaft 28. Further, the support 27 is turnable around the shaft 28. With these features, the performance of a slide-type vehicle-mountable sun visor can be enhanced.

However, the conventional sun visor has entailed the problems described below.

FIG. 2 is a cross section taken along the line A-A of a conventional sun visor body 1. The sun visor body 1 has a hollow structure that two resin core members 2a, 2b are bent in a hinge 4. A support 8 and a shaft 9 are provided inside of the sun visor body 1. Further, in a state in which the resin core members are opened prior to folding them, the sun visor body 1 is integrally molded in the shape such that the resin core members 2a, 2b are coupled to each other via the hinge 4.

The support 8 has guide groove 8a, 8b. Further, on the interior faces of the resin core members 2a, 2b, two ribs 6 are provided along the longitudinal direction of the sun visor body 1, and are engaged with the guide grooves 8a, 8b, thereby guiding sliding of the support 8.

Inside of the sun visor body 1, in order to ensure that the support 8 slides smoothly, a sliding resistance between the guide grooves 8a, 8b and two ribs 6 needs to be reduced. For this reason, when the resin core members 2a, 2b are folded on each other, the ribs 6 need to precisely engage with the guide grooves 8a, 8b without displacement. Further, the resin core members need to be bent so that no displacement arises all over an area in which the support 8 slides. If fabrication precision obtained at the time of manufacture is not sufficient, discrepancy arises with alignment obtained at the time of folding. As a result, there has been a problem that defectives with large sliding resistance and poor operability arise.

Further, if displacement arises with ribs 7a, 7b opposed to a bottom face of the support 8 shown in the figure, a step height is formed at a tip end abutment portion. Therefore, if the bottom face of the support 8 comes into contact with the ribs 7a, 7b, the support 8 is inclined, and thereafter, strongly abuts against the rib 5 or 6 which is provided on the interior faces of the resin core members 2a, 2b. As the result of the strong abutment, there has been a problem that a sliding resistance increases, an operational force exerted at the time of slide operation is distorted, and defectives arise.

Accordingly, the present invention has been made to solve the above-described problems, and aims to provide a vehicle-mountable sun visor with good operability exerted at the time of slide operation of the entire sun visor.

SUMMARY OF THE INVENTION

In order to solve the above-described problems, a vehicle-mountable sun visor is provided with: a shaft, one end of which is mounted on a vehicle body; a support mounted on the shaft; a sun visor body in which two resin core members are coupled with each other by a hinged portion and the two resin core members are folded with the hinged portion being a fold so as to involve the other end of the shaft and the support; a first slide guide provided in proximity to the hinged portion, for guiding sliding of the support; and a second slide guide provided on an internal face of one of the two resin core members, for guiding sliding of the support, wherein: the support is slidably held in a space surrounded by the folded two resin core members, the first slide guide, and the second slide guide; the support turns around the shaft, whereby the sun visor body turns; and the support slides along the two resin core member, the first slide guide, and the second slide guide, whereby the sun visor body slides relative to the shaft.

According to the present invention, the support is held between the second slide guide, which is provided on either one of the two resin core members, and the interior faces of the two resin core members, so that the magnitude of the sliding resistance exerted at the time of sliding is not influenced due to displacement of the resin core members. In this manner, dispersion in operational force exerted when the sun visor body slides can be reduced, and operability of the sun visor can be enhanced.

The vehicle-mountable sun visor of the present invention is characterized in that: the first slide guide is a protrusion provided along the hinged portion on the interior face of one of the two resin core members, which covers a step height arising at the hinged portion by the two resin core members being folded on each other.

In this manner, the support never abuts against the step height of the hinged portion while in sliding. Thus, the sliding resistance never increases, and the sun visor body can slide smoothly.

The vehicle-mountable sun visor of the present invention is characterized in that: at a site with which the two resin core members are folded in abutment, one of the resin core members on which the protrusion is not provided, and the protrusions abut against each other so as to ensure that no displacement occurs, restraining a bending width of the hinged portion.

According to the present invention, it is possible to prevent a displacement exerted by excessive bending of the hinged portion when the two resin core members are folded on each other. In this manner, the resin core members can be easily superimposed on each other, making it possible to simplify work.

The vehicle-mountable sun visor of the present invention is characterized in that: an engagement portion supporting the second slide guide is provided on one of the two resin core members on which the second slide guide is not provided.

In this way, the second slide guide can be prevented from being deformed by the pressure exerted when the support slides, making it possible to ensure stable operability of the sun visor body.

According to another aspect of the present invention, the vehicle-mountable sun visor according to the present invention is characterized in that: the first slide guide is a slide groove formed along the hinged portion in a state in which the two resin core members are folded on each other; the support has a first slide support which is hooked on the slide groove and a second slide support which is hooked at an opening end of the second slide guide; and the support is slidably held on one of the two resin core members on which the second slide guide is not provided in a state in which the first slide support is hooked on the slide groove and the second slide support is hooked at the opening end of the second slide guide.

According to the present invention, the support is hooked at the opening end of the second slide guide and on the slide groove. Further, the resin core member on which the second slide guide is not provided is merely slidably held. Thus, the magnitude of the sliding resistance exerted when the support is slid is not influenced by the displacement of the resin core members. In this manner, dispersion of the operational force exerted when the sun visor body slides can be reduced, and the operability of the sun visor can be enhanced.

A vehicle-mountable sun visor according to the present invention is directed to a vehicle-mountable sun visor comprising: a sun visor body formed in a hollowed shape; a support furnished in the sun visor body; a shaft bent in a substantial L-shape, one end of which is turnably inserted into the support, and a bracket for mounting the other end of the shaft on a vehicle side, the shaft being turnably supported relative to the bracket, the sun visor body being turnably supported relative to the shaft, wherein: on an interior wall of the sun visor body, a guide rail extending along a longitudinal direction thereof is formed; the support is slidably interposed on the guide rail to slidably support the sun visor body relative to the shaft, and then, variably constitute a light interruption range of the sun visor body; an elastically deformable engagement piece is formed on either one of the support and the guide rail to further position the sun visor body on the shaft; and an engagement portion, with which the engagement piece is to be engaged, is formed on the other one of the support and the guide rail.

A sun visor body is constituted by covering a sun visor skin such as a woven cloth, a non-woven cloth, or a PVC sheet on an exterior surface of a resin core member.

A support furnished in the sun visor body is made of a synthetic resin mold such as polyacetal (POM), a shaft hole is provided, and an insertion portion of a shaft is turnably borne in the shaft hole. In this manner, the sun visor body may be provided to turn along the periphery of the shaft.

With this structure, the present invention can provide a vehicle-mountable sun visor in which an engagement piece is engaged with an engagement portion. A sun visor body is reliably positioned and held on a shaft through a support, and a displacement exerted by vibration of a moving vehicle never occurs with the sun visor body, accordingly, allowing the sun visor to always reliably interrupt irradiating light such as sunlight or headlight of an oncoming vehicle.

The sun visor of the present invention may be constituted so that the engagement piece and the engagement portion with which the engagement piece is to be engaged are formed to be spaced from each other in one pair, respectively. Positioning locations of the sun visor body relative to the shaft can be determined at both ends of the shaft, accordingly.

With this structure, a sun visor body is positioned at both ends of a shaft, and a light interruption range can be ensured to the maximum, through the use of an elongated dimensional full length of the shaft.

The present invention may be applicable where the engagement piece is provided at the support and the engagement portion is provided at a respective one of the guide rails, and conversely, the engagement piece is provided at the guide rail and the engagement portion is provided at the support.

The engagement piece is provided at the support and the engagement portion is provided at the guide rail, or alternatively, the engagement piece is provided at a respective one of the guide rails and the engagement portion is provided at the support, whereby they can be appropriately selected according to the entire shape of the sun visor.

According to the present invention, a vehicle-mountable sun visor can be provided in which: the engagement piece can be constituted to form a curved engagement piece portion at a spring piece shaped like a plate and the engagement portion can be constituted by an engagement recess with which the curved engagement piece portion is to be engaged; and is engaged in the engagement recess constituted by the spring piece, thereby allowing the sun visor to reliably perform positional restraint on the shaft in the sun visor body and to always reliably interrupt irradiation light such as sun light or headlight of an oncoming vehicle.

According to the present invention, a vehicle-mountable sun visor can be provided in which: the engagement piece is constituted to form a curved engagement piece portion at a plate-shaped spring piece and the engagement portion can be formed of a protrusion with which the curved engagement piece portion is to be engaged in abutment; and a curved engagement piece portion of a spring piece constituting an engagement piece is abutted against an engagement portion which is made up of a protrusion, thereby allowing the sun visor to reliably perform positional restraint on a shaft in a sun visor body and to always reliably interrupt irradiating light such as sunlight or headlight of an oncoming vehicle.

A vehicle-mountable sun visor in which a sun visor body slides along a shaft, one end of which is pivoted on a vehicle panel, is characterized by comprising: a hollow portion which is a space provided inside of the sun visor body; a support which is mounted on the other end of the shaft and is slidably encapsulated in the hollow portion; a first lock portion with which the support abuts at a position at which the sun visor body slides and stops in a direction in which the shaft is to be accommodated; and a second lock portion with which the support abuts at a position at which the sun visor body slides and stops in a direction in which the shaft is to be extended, at least one of the first and second lock portions having: an engagement hole which is provided on a wall face defining the hollow portion, the support having a protrusive portion which is engaged with the engagement hole.

According to the present invention, the vehicle-mountable sun visor is structured so that a protrusive portion provided at a support mounted on a tip end of a shaft is engaged with an engagement hole of a lock portion provided at a sun visor body, allowing a sun visor body to be held at the shaft. In this manner, even if a resin core member constituting the sun visor body expands, the sun visor body is held in a stable state by the support.

Further, the vehicle-mountable sun visor according to the present invention is characterized in that the protrusive portion provided at the support has a tip end processed in a tapered shape. In this manner, the protrusive portion is easily engaged with the engagement hole provided at the lock portion, allowing for improved functionality of the vehicle-mountable sun visor.

[Advantageous Effect of the Invention]

The present invention can provide a vehicle-mountable sun visor with good operability when a sun visor body is operated to be slid.

DESCRIPTION OF THE PREFERRED EMBODIMENTS

Figure 1:
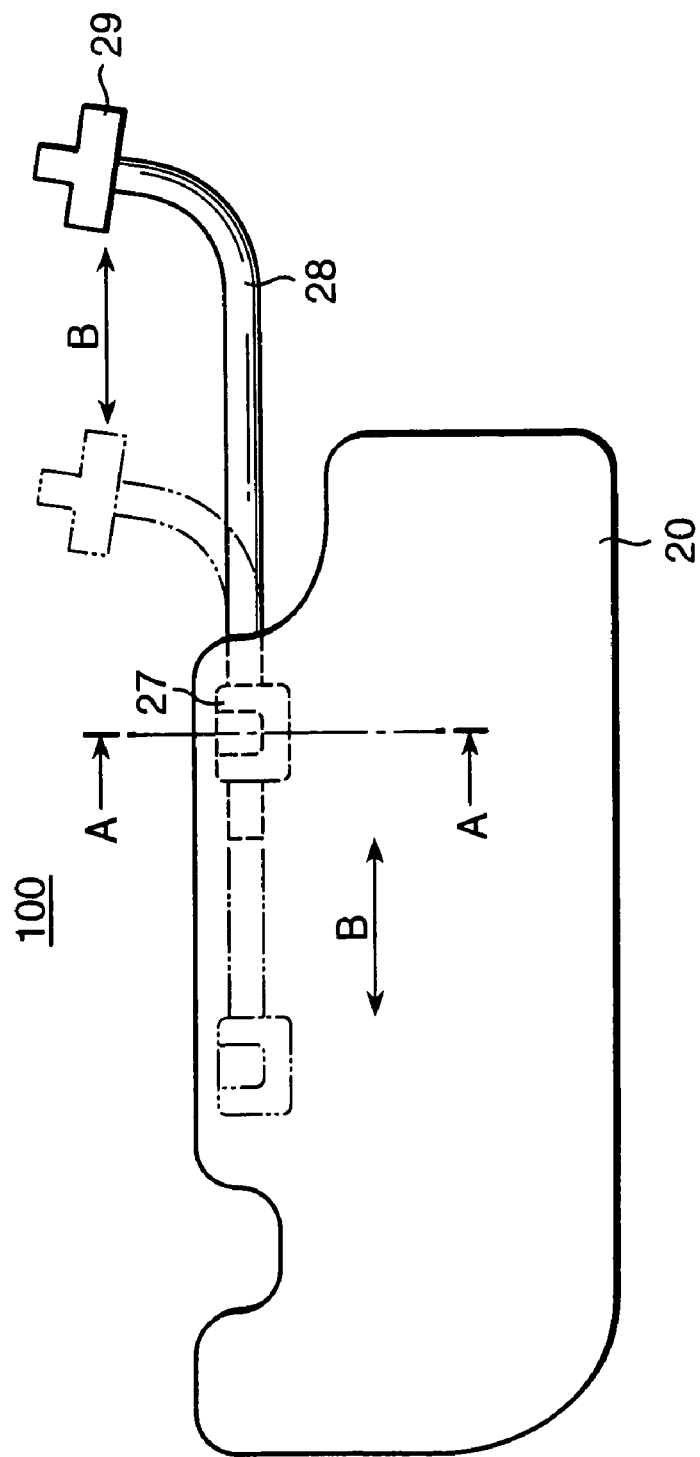
FIG. 1 is a schematic view showing an appearance of a vehicle-mountable sun visor according to the present invention.
Figure 2:
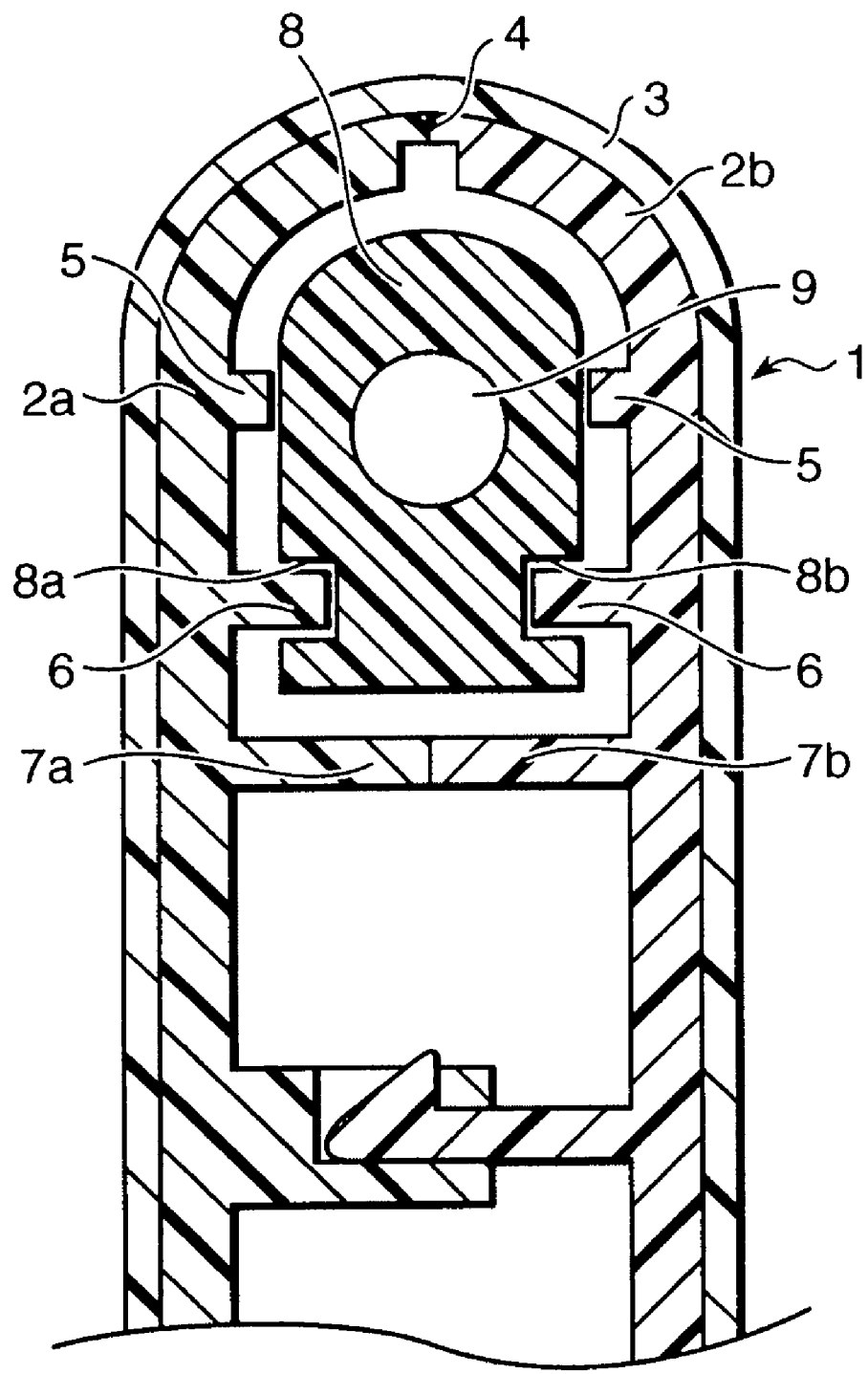
FIG. 2 is a schematic cross section taken along the line A-A of a vehicle-mountable sun visor according to the related art.

Hereinafter, preferred embodiments of a vehicle-mountable sun visor according to the present invention will be described, referring to the drawings.

Figure 3:
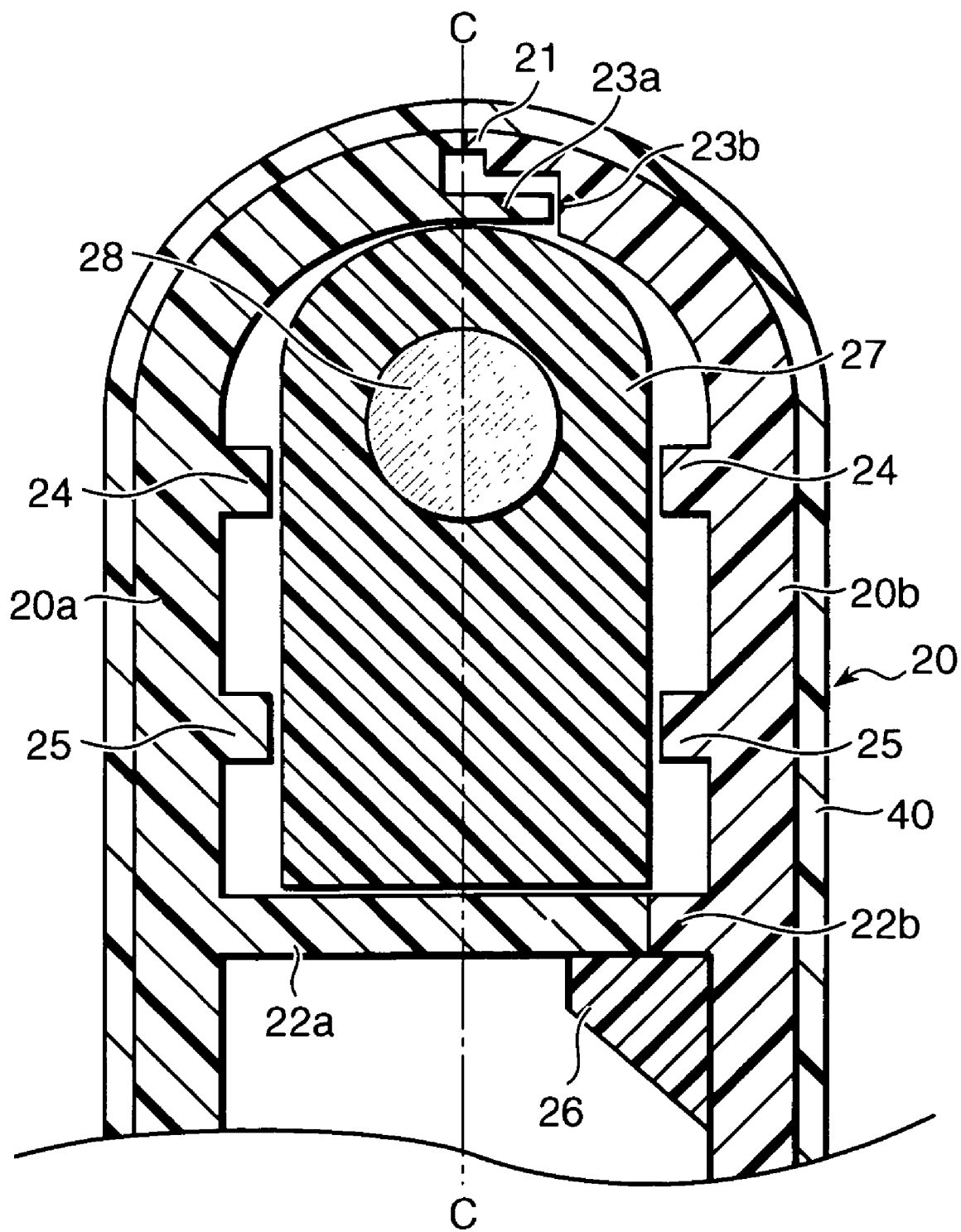
FIG. 3 is a schematic view cross section taken along the line A-A of a vehicle-mountable sun visor according to the present invention.

A first embodiment of the vehicle-mountable sun visor according to the present invention will be described. FIG. 3 is a schematic cross section taken along the line A-A of a vehicle-mountable sun visor 100 according to the embodiment. A sun visor body 20 has a hollow structure that two resin core members 20a, 20b are formed by folding and superimposing them at a hinged portion 21. Further, a protrusion 23a serving as a first slide guide is provided along the resin core member 20a, and a second slide guide 22a is provided on the interior face of the resin core member 20a.

A support 27 is held in a space surrounded by the resin core members 20a and 20b and the first and second slide guides 23a and 22a, and is involved in the sun visor body. In other words, the support 27 is engaged with a slide groove formed by the first slide guide 23a and the second slide guide 22a, and further, is restrained by means of the resin core member 20b so as not to extend off the slide. The first slide guide 23a covers a step height exerted by bending of the hinged portion 21, and the support 27 abutting against the first slide guide 23a can slide smoothly. Furthermore, the second slide guide 22a has a width such that the entire bottom face of the support 27 can be abutted, and ensures safety required at the time of sliding movement.

In the embodiment, the second slide guide 22a is broadly provided in width so that an opening end face of the second slide guide 22a abuts against a protrusion 22b provided on the resin core member 22a. Unlike the embodiment, the second slide guide 22a does not always need to be large in width, in order to provide the feature. However, in order to ensure safety associated with sliding movement, it is preferable that the opening end of the second slide guide 22a is provided to have a width such that at least the opening end of the second slide guide 22a is positioned at the side of the resin core member 20b beyond the centerline C-C shown in the figure.

The support 27 is turnably mounted on the shaft 28. The sun visor body 20 made up of resin members 20a, 20b for holding the support therebetween, is turnable around the shaft 28 by turning the support 27. Further, on the interior faces of the resin core members 20a and 20b abutting against the support 27, protrusions 24, 25 are provided along a sliding direction. With these protrusions 24, 25, a contact area between the support 27 and the interior faces of the resin core members 20a, 20b can be reduced. Further, the resin core members 20a, 20b can slidably hold the support 27 therebetween.

The vehicle-mountable sun visor according to the present invention is characterized in that it slides smoothly with a small operational force and is free of displacement due to vehicle vibration even if it is used at an intermediate position included in a sliding range. In order to ensure this antithetical performance, there is a need to adjust in an appropriate range a sliding resistance which arises between the interior faces of the resin core members 20a, 20b, and the support 27. To do this, a subtle clearance must be provided between the core member face and the support 27. If the protrusions 24 and 25 do not exist, a contact area between the support 27 and the core member face increases, so that a sliding resistance significantly varies with a slight widthwise change in clearance. Thus, it becomes difficult to adjust the sliding resistance in an appropriate range. If the protrusions 24, 25 are provided, a contact area between the support 27 and the core member face is reduced, and the tolerance of the clearance increases. As a result, the sliding resistance can be adjusted within an appropriate range by adjusting the height of the protrusion 24, 25 in consideration of the fabrication precision of resin molding and the precision of folding fabrication of the resin core member. While, in the embodiment, the protrusions 24, 25 are provided on the interior faces of the resin core members 20a and 20b, respectively, the support 27 can slide smoothly without a backlash by employing a structure of supporting an object at three points, i.e., at two protrusions 24, 25 on the interior face of the resin core member 20a and one protrusion which is provided on the interior face of the resin core member 20b, or alternatively, by employing a structure of supporting an object at three points, i.e., at one protrusion which is provided on the interior face of the resin core member 20a and the two protrusions 24, 25 which are provided on the interior face of the resin core member 20b.

As the first slide guide, a protrusion 23a serves to abut against a step height 23b which is provided along a hinged portion 21 on the interior face of the resin core member 20b when the resin core members 20a and 20b are superimposed on each other after bent at the hinged portion 21, and thereafter, restrain the bending of the hinged portion 21. This makes it possible to prevent excessive bending of the hinged portion 21 and facilitate alignment work to be done at the time of superimposing the resin core members 20a and 20b on each other.

In the embodiment, the protrusion 23a serving as the first slide guide is provided on the interior face of the resin core member 20a on which the second slide guide 22a was provided, and the opposite step height 23b is provided on the interior face of the resin core member 20b. On the contrary, even if the protrusion 23a is provided on the resin core member 20b, and the step height 23b is then provided on the resin core member 20a, advantageous effect similar to the above is attained as to limiting bending of the hinged portion 21. However, advantageous effect of enhancing dimensional precision between the second slide guide 22a and the protrusion 23a is attained by providing the second slide guide 22a and the protrusion 23a at the same resin core member side. This is because, if they are provided on the same resin core member side, it is possible to ensure dimensional precision maintaining fabrication precision obtained at the time of resin molding, whereas, if they are provided on different resin core members, dimensional precision is degraded due to dispersion exerted at the time of bending fabrication of hinge. In other words, dispersion in clearance between the protrusion 23a as the first slide guide and the second slide guide 22a increases, and then, a sliding resistance on the support 27 that slides therebetween becomes completely different from usual. Thus, a probability that defectives due to inferior operability arise increases. Therefore, as shown in the embodiment, it is preferable that the protrusion 23a limiting the bending of the second slide guide 22a and the hinged portion is provided on the same resin core member side.

Further, the second slide guide 22a abuts against the protrusion 22b that is provided on the interior face of the resin core member 20b, and is then supported after engaged with a support rib 26 which is similarly provided on the interior face of the resin core member 20b. The support rib 26 serves as an engagement portion which is provided on the resin core member 20b. This slide guide is supported so that no deformation arises at an opening end of the second slide guide 22a that is provided on the interior face of the resin core member 20a, thus stabilizing operability of the sun visor body.

From another point of view, an engagement portion, which is formed by a combination between the protrusion 22b and the support rib 26, serves to engage with the opening end of the second slide guide 22a, and then, restrains a movement of the resin core member 20b shifting toward the hinged portion 21. The protrusion 23a restrains the movement of the resin core member 20b shifting from the hinged portion 21 to the second slide guide 22a by limiting bending of the hinged portion 21. As a result, the engagement portion that is formed by the combination between the protrusion 22b and the support rib 26, and the protrusion 23a cooperatively serves to stabilize a state in which the resin core members 20a and 20b are superimposed on each other.

Further, by depositing and solidifying a site against which the opening end of the second slide guide 22a and the protrusion 22b abut, it is possible to stabilize superimposition between the resin core members 20a and 20b and ensure smooth sliding of the support 27, thereby enhancing operability of the sun visor body. This enhancement can be accomplished, for example, by providing an opening for performing deposition of part of the resin core member 20a or 20b and applying a welding process to an abutment portion through an opening. Welding approaches can include those such as ultrasonic welding, vibration welding and laser welding.

In the vehicle-mountable sun visor 100 shown in FIG. 3, a face of the second slide guide 22a abutting against the support 27 receives the entire abutment face that is provided on the side of the support 27. In other words, after a displacement has arisen between the resin core members 20a and 20b, even if a step height arises at a position against which the protrusion 22b and the opening end of the second slide guide 22a abut, the support 27 never comes into contact with the step height. Thus, the support is never inclined and strongly abuts against the interior face of the resin core member 20a or 20b. Therefore, the sliding resistance exerted at the time of sliding the support 27 is not influenced by such displacement, allowing the sun visor body 20 to ensure its stable operability.

As described above, according to the embodiment of the present invention, the second slide guide is provided on only one of the two resin core members, so that the support that sides inside of the sun visor body is held between a respective one of the two resin core members and the second slide guide. Therefore, a vehicle-mountable sun visor with its small sliding resistance and good operability is achieved without dependency upon displacement which might arise at the time of folding the resin core members.

Hereinafter, a modification of the vehicle-mountable sun visor according to other embodiments of the present invention will be described. FIG. 4 is a schematic view showing another exemplary aspect of an engagement portion which is provided on an interior face of a resin core member 20b in order to engage with an opening end of a second slide guide 22a. Hereinafter, like constituent elements common to those in the embodiment shown in FIG. 3 are designated by like nomenclatures and reference numerals. A duplicate description thereof is omitted.

Figure 4A:
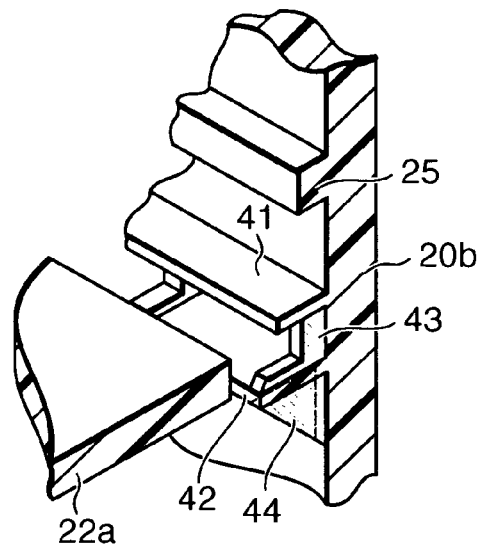
FIG. 4A is a perspective view showing an engagement portion of a vehicle-mountable sun visor according to a first embodiment.

Engagement portions which are provided on the interior face of the resin core member 20b are equivalent to at least one or more ribs 43 which are provided between two-layered peaked protrusions 41 and 42 extending longitudinally of the entire sun visor. A respective one of the ribs 43 has a cavity which is engaged with the opening end of the second slide guide 22a. FIG. 4A is a perspective view showing ribs which are disposed between the two-layered peaks.

Figure 4B:
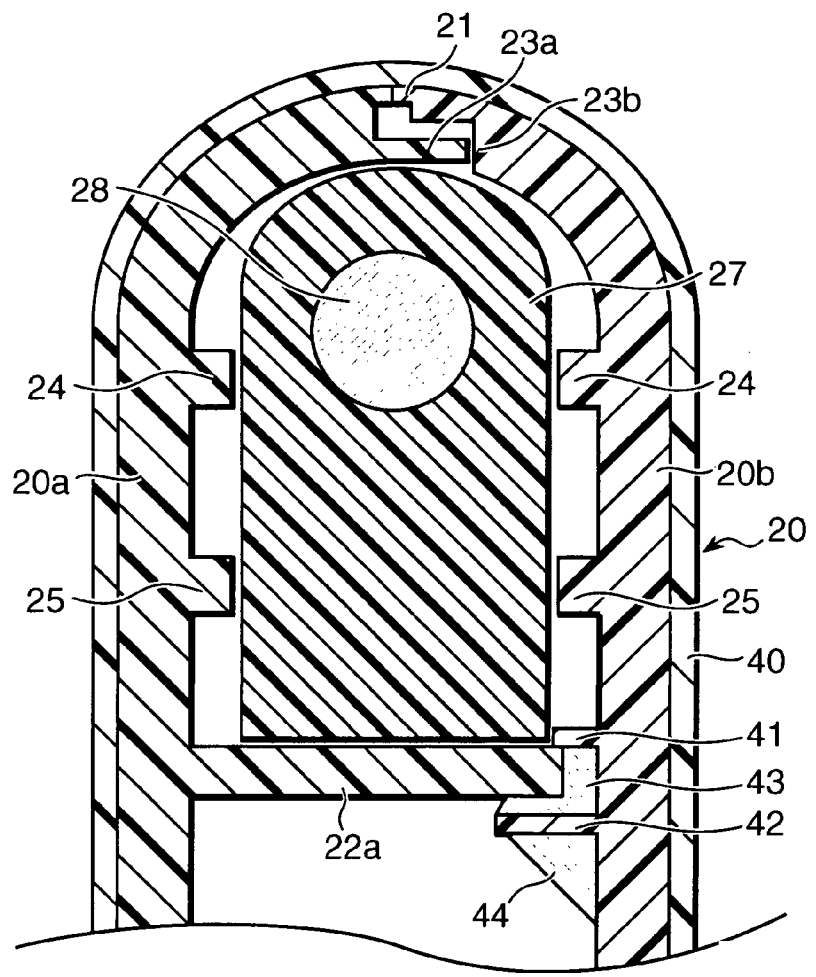
FIG. 4B is a schematic cross section taken along the line A-A of the vehicle-mountable sun visor according to the first embodiment.

FIG. 4B is a schematic cross section taken along the line A-A of the sun visor body 20. As shown in the figure, the opening end of the second slide guide 22a is engaged with the cavity that is provided on the rib 43, whereby the sun visor body is supported so that no deformation arises at the opening end of the second slide guide 22a, and simultaneously, movement of the resin core member 20b is restrained, stabilizing superimposition of the sun visor body.

Figure 5A:
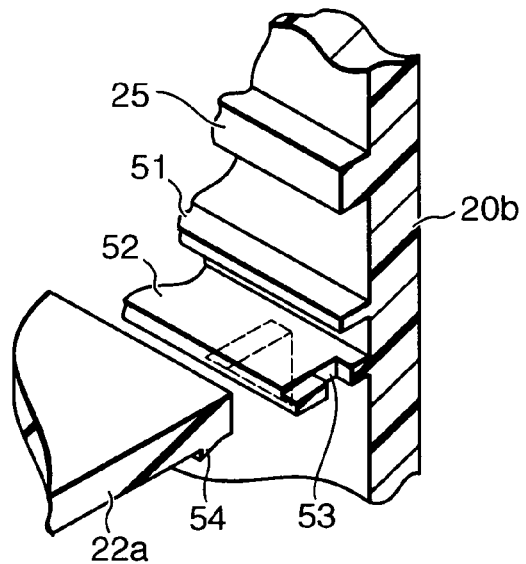
FIG. 5A is a perspective view showing an engagement portion of a vehicle-mountable sun visor according to the first embodiment.

Next, a modification of the sun visor according to the first embodiment of the present invention will be described. In the examples shown in FIGS. 5A and 5B, the opening end of the second slide guide 22a is engaged and locked between the two-layered peaked protrusions 51 and 52 that are provided extensively longitudinally of the sun visor body. FIG. 5A is a perspective view schematically showing the two-layered peaked protrusions 51, 52 that are provided on the interior face of the resin core member 20b. Among these two-layered peaked protrusions, the protrusion 52 shown at the lower part of the figure overhangs longer than the top peaked protrusion 51, and has at least one or more engagement holes 53. On the other hand, an engagingly fitting claw 54 which is engaged with the engagement hole 53 is provided at an end of the second slide guide 22a that is engaged with the two-layered peaked protrusions 51, 52.

Figure 5B:
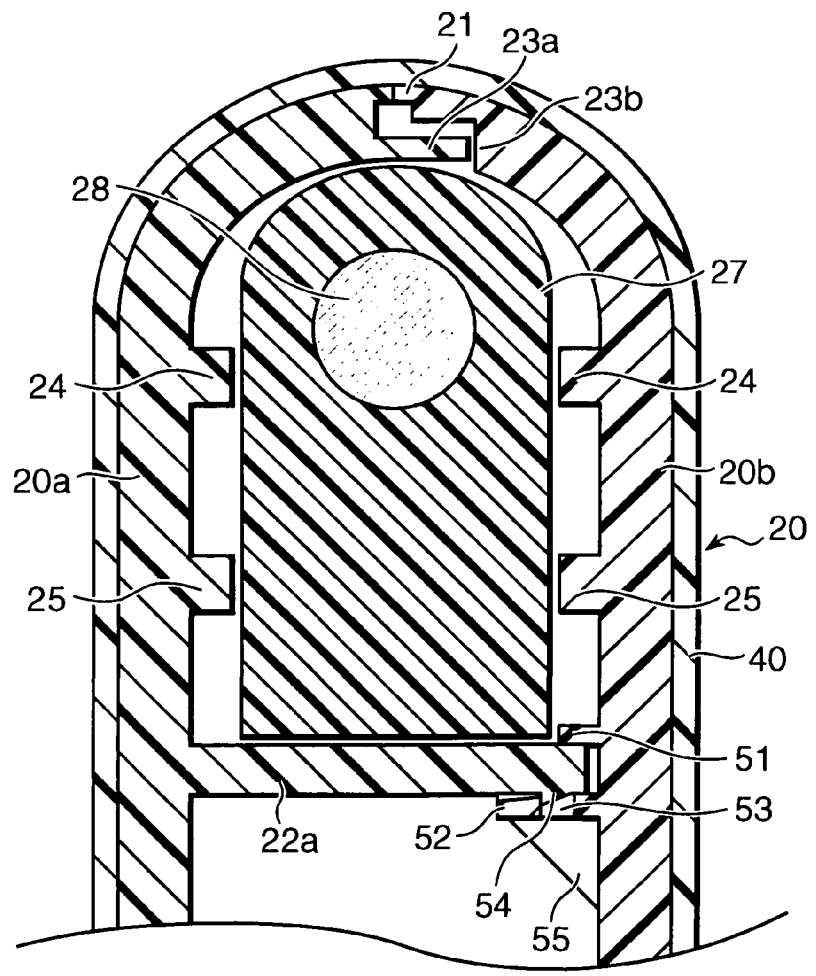
FIG. 5B is a schematic cross section taken along the line A-A of the vehicle-mountable sun visor according to the first embodiment.

FIG. 5B is a schematic cross section taken along the line A-A of the sun visor body 20 according to the embodiment. The opening end of the slide guide 22a is engagingly interposed between the two-layered peaked protrusions 51 and 52. Further, the engagingly fitting claw 54 is engaged with the engagement hole 53. Thereafter, the opening end of the second slide guide 22a is locked with the resin core member 20b. A plurality of ribs 55, for supporting and reinforcing the peaked protrusion shown at the lower part of the figure, are disposed along the peaked protrusion. In this manner, the peaked protrusion 52 is endurable against a pressure exerted when the opening end of the slide guide 22a is engaged with the peaked protrusion 51, 52, and thereafter, the engagingly fitting claw 54 is engagingly fitted with the engagement hole 53.

A modification of the vehicle-mountable sun visor according to the first embodiment of the present invention will be described. In the examples shown in FIGS. 6A and 6B, a second slide guide 22a and a resin core member 20b are tightened with screws. The second slide guide 22a has an engagement hole 61 for receiving a screw shaft, and is locked with the interior face of the resin core member 20b after being engagingly fitted to the shaft of the screw inserted through the screw hole provided on the resin core member 20b.

Figure 6A:
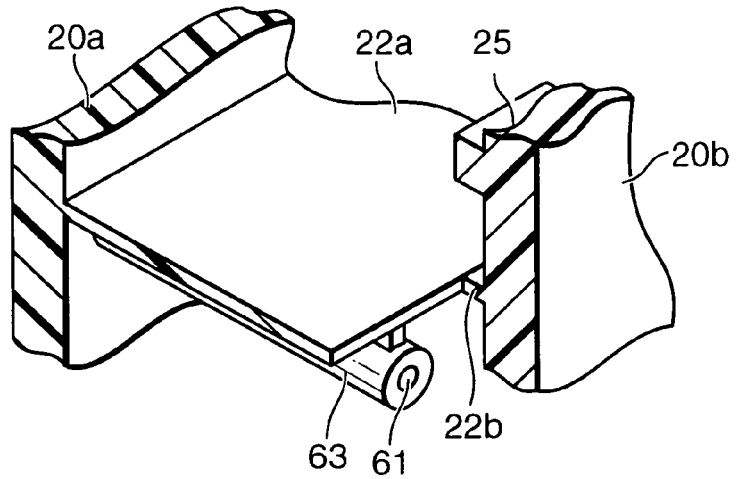
FIG. 6A is a perspective view showing an engagement portion of a vehicle-mountable sun visor according to the first embodiment.
Figure 6B:
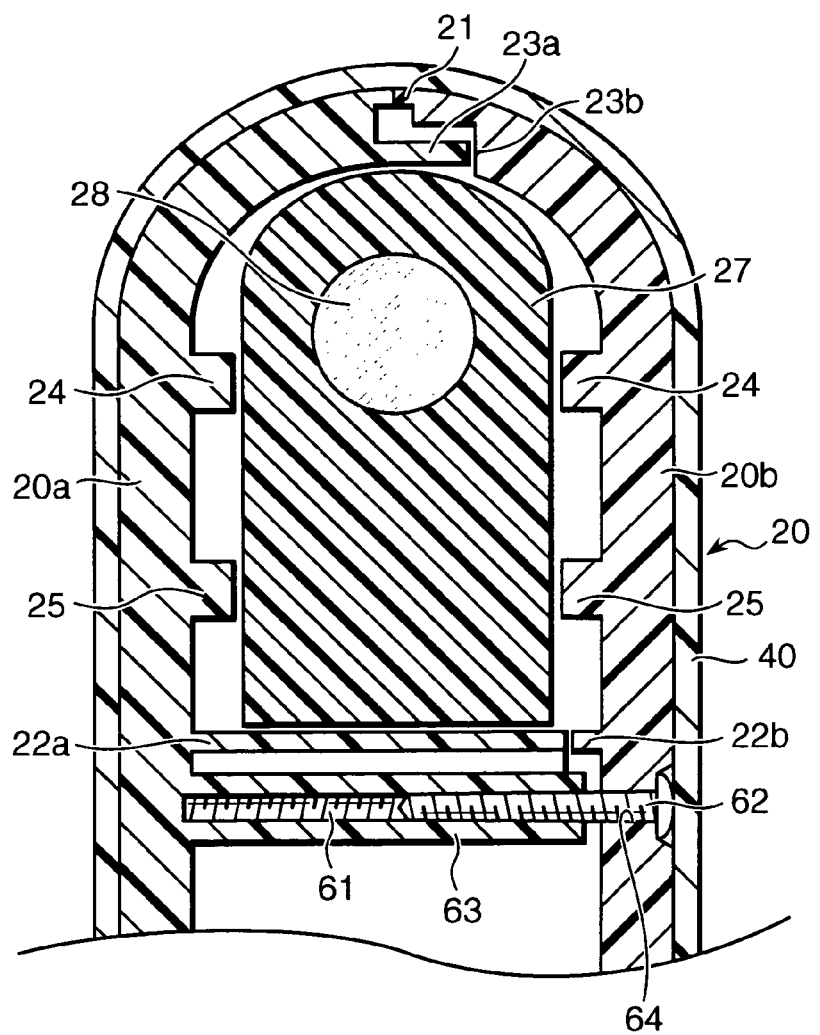
FIG. 6B is a schematic cross section taken along the line A-A of the vehicle-mountable sun visor according to the first embodiment.

FIG. 6A is a perspective view schematically showing an opening end face of the second slide guide 22a. In the figure, a bossed portion 63 having an engagement hole 61 engagingly fitted to the shaft of a screw is molded on a bottom face of the second slide guide 22a. FIG. 6B is a schematic cross section taken along the line A-A of a sun visor body according to the embodiment. A screw 62 is inserted through a screw hole 64 formed on the resin core member 20b, and thereafter, is engagingly fitted to the engagement hole 61 of the bossed portion 63 involved in the second slide guide 22a. In this manner, the second slide guide 22a is locked with the resin core member 20b, so that there does not arise a problem that, when the support 27 slides, the second slide guide 22a is deformed, resulting in displacement, for example. Therefore, stable operability of the sun visor body is achieved.

Figure 7:
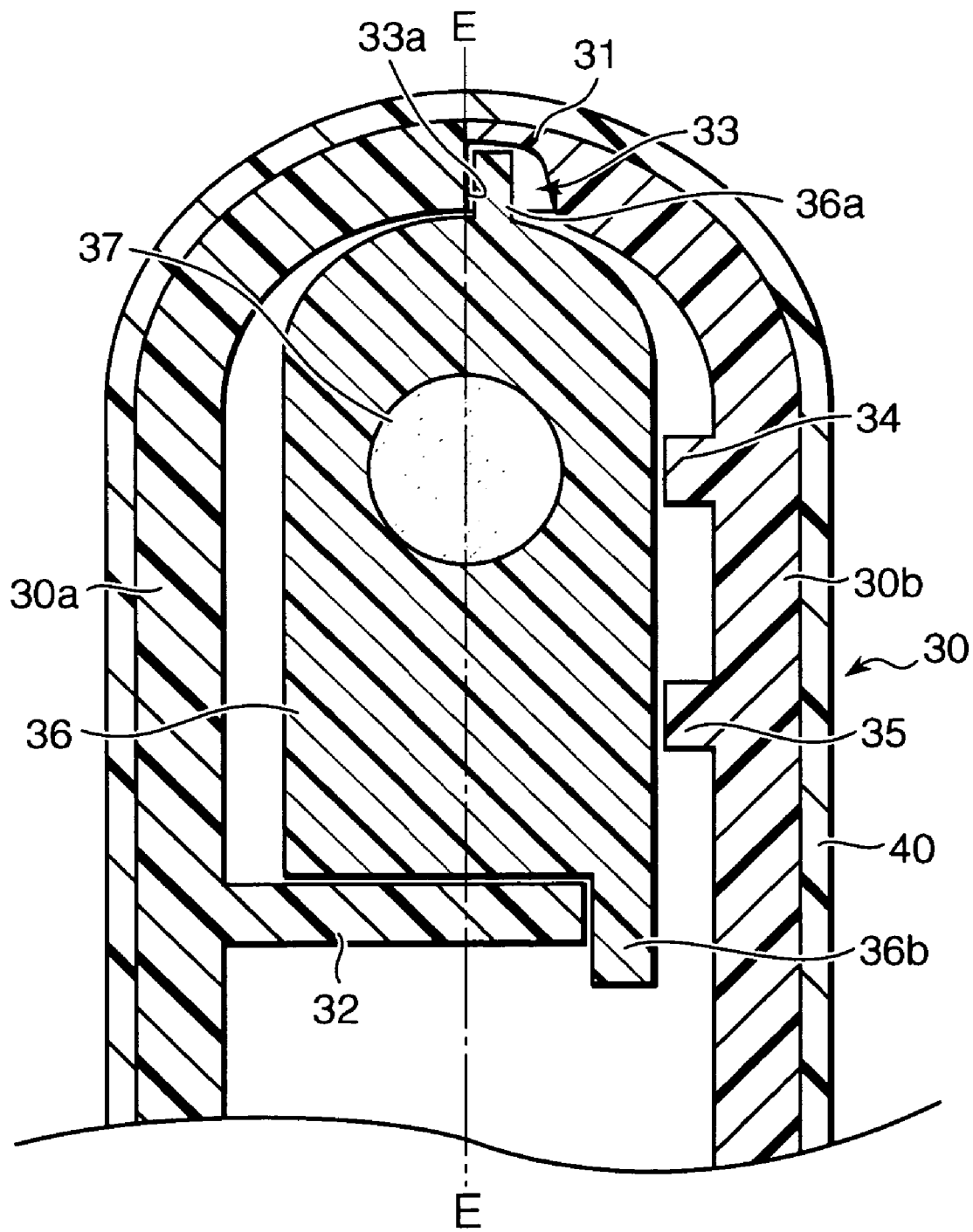
FIG. 7 is a schematic cross section taken along the line A-A of a vehicle-mountable sun visor according to a second embodiment.

Next, a second embodiment of a vehicle-mountable sun visor according to the present invention will be described. FIG. 7 is a schematic cross section taken along the line A-A of the sun visor 200 according to the embodiment. The sun visor 200 is provided with: a shaft 37, which is mounted on a vehicle body at one end; a support 36, which is turnably mounted on the shaft 37; and a sun visor body 30. In the sun visor body 30, resin core members 30a and 30b are formed to be folded at a hinged portion 31. A support 36, which is mounted on the shaft 37, is involved in a space between the resin core members 30a and 30b. The support 36 slides longitudinally of the sun visor body 30, thereby sliding the sun visor body 30 relative to the shaft 37. Further, the support 36 turns around the shaft 37, and the sun visor body 30 involving the support 36 thereby turns. Furthermore, a decorative skin 40 is adhered to an exterior face of the sun visor body 30.

In a state in which the resin core members 30a and 30b are folded on each other, the hinged portion 31 is bent, thereby forming a guide groove 33 serving as the first slide guide. In the support 36, two protrusions, i.e., the first and second supports 36a and 36b are provided at the upper and lower ends shown in the figure.

In the structural point of view, the first slide support 36a is hooked on a side face 33a of the guide groove 33, and the second slide support 36b is hooked at an opening end of the second slide guide 32, so as to hook the support 36 in a groove-shaped slide space obtained between the resin core member 30a and the second slide guide 32. Further, the resin core member 30b is folded in a superimposed state at the hinged portion 31, whereby protrusions 34, 35 provided on the interior face of the resin core member 30b abut against the support 36 to hold it inside of the sun visor body. At this time, the support 36 is held in a longitudinally slidable state of the sun visor body 30 along the guide groove 33, which serves as the first slide guide, and the second slide guide 32.

According to the embodiment, the sliding resistance exerted when the support 36 slides, is dependent upon a pressure exerted when the protrusions 34, 35 that are provided on the interior face of the resin core member 30b abuts against the support 36, without dependency upon the displacement between the resin core members 30a and 30b folded at the hinged portion 31. The protrusions 34, 35 serve to merely restrain movement so that the support 36 does not run off from a slide space between the second slide guide 32 and the resin core member 30a. Further, as set forth previously, by varying the height of a respective one of the protrusions 34, 35, it becomes possible to adjust a clearance between the support 36 and a respective one of the protrusions 34, 35, and in turn, adjust the sliding resistance of the support 36 within its appropriate range. As a result, a sun visor can be provided which slides smoothly with a small operational force and eliminates the shifting from a set position due to vibration of a moving vehicle. While, in the embodiment, each of the protrusions 34, 35 is provided on the interior face of the resin core member 30b, the support 36 can slide smoothly without a backlash by employing a structure that the support is supported at three points, i.e., at one or more protrusions, on the side wall 33a of the slide groove 33 serving as the first slide guide, and at an opening end of the second slide guide 32.

Figure 8:
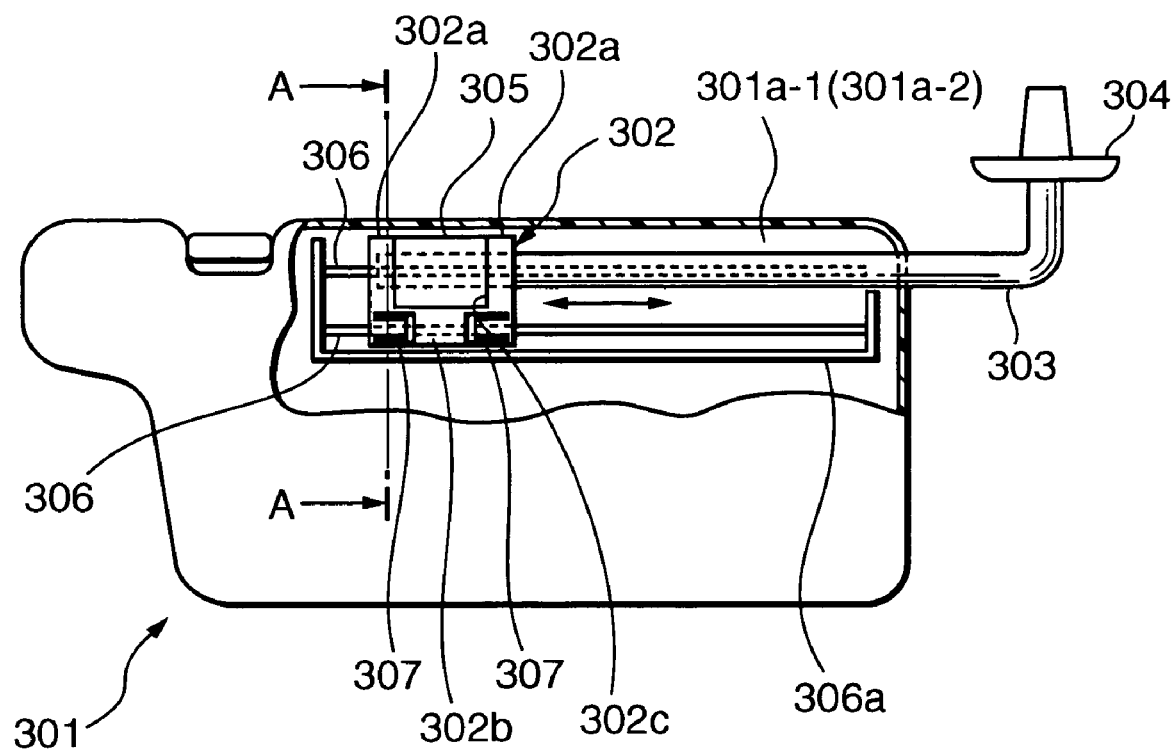
FIG. 8 is a sectional front view depicting part of the sun visor body in a vehicle-mountable sun visor according to a third embodiment of the present invention.
Figure 9:
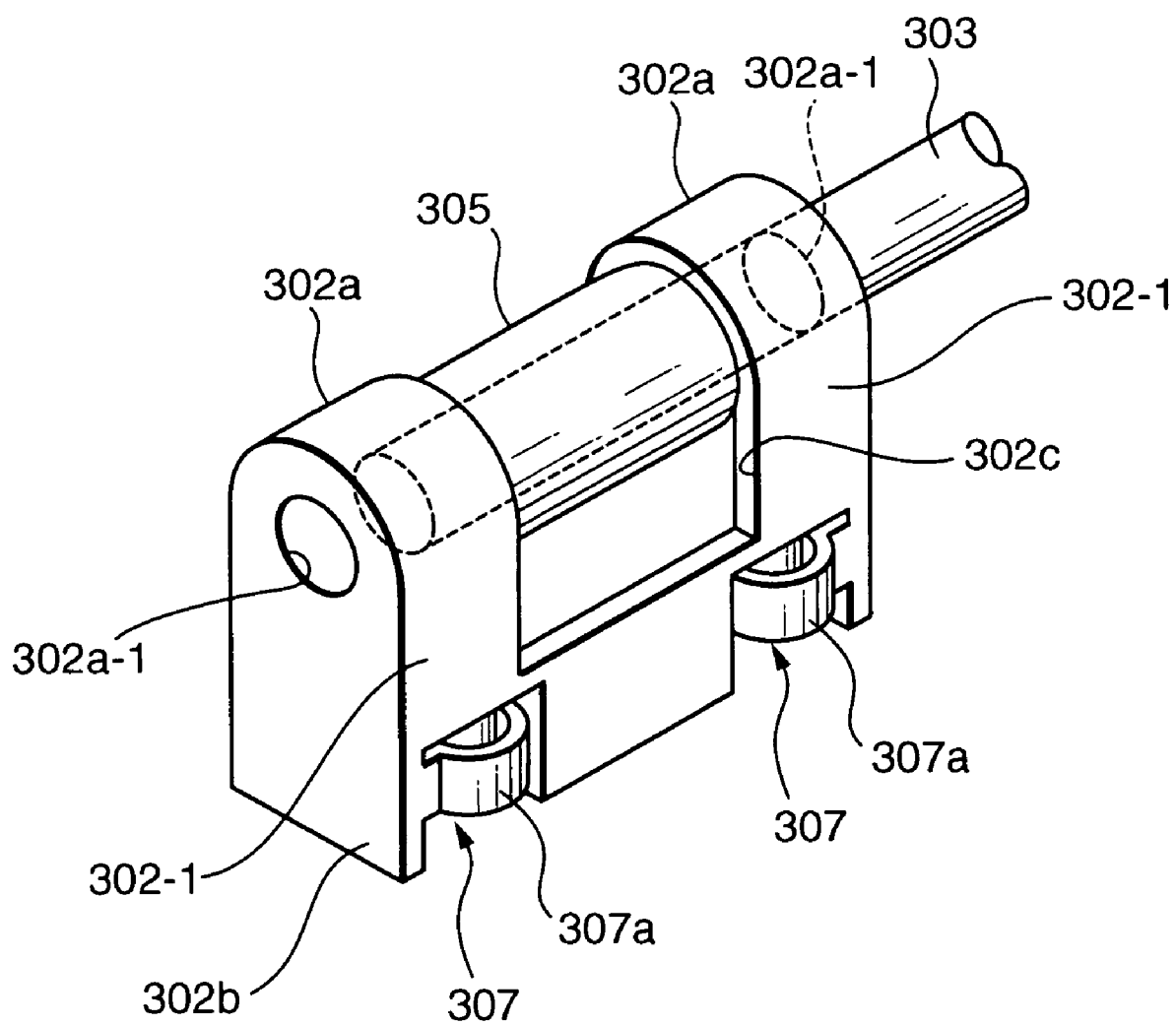
FIG. 9 is a perspective view depicting an interrelationship between a support and a shaft in FIG. 8.
Figure 10:
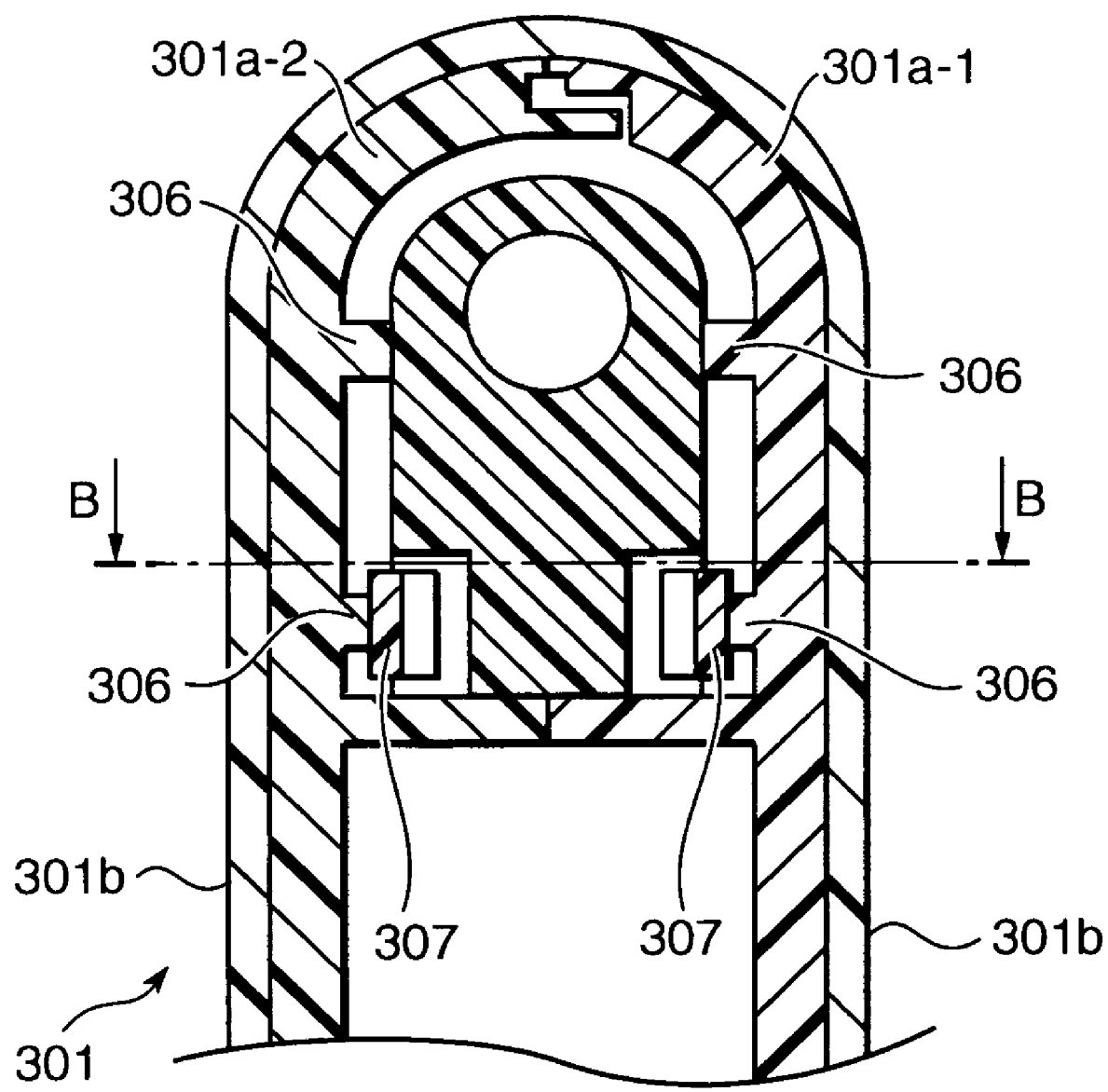
FIG. 10 is a sectional view taken along the line A-A of FIG. 8.
Figure 11:
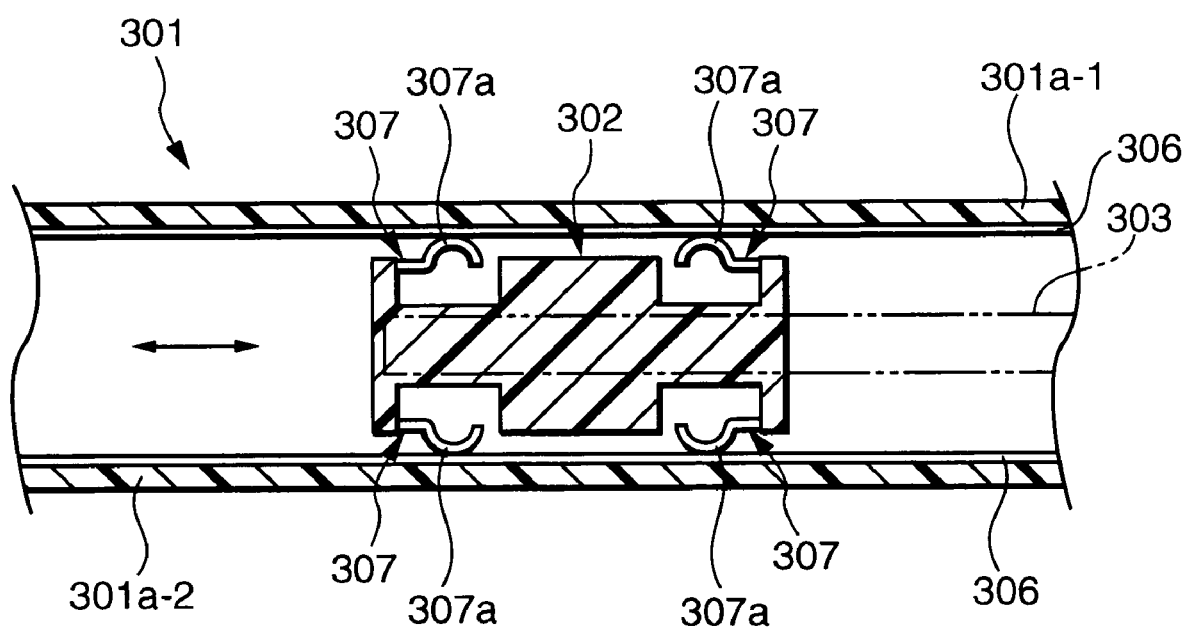
FIG. 11 is a sectional view taken along the line B-B of FIG. 10 in a neutral state in which the support is slidable without being engaged with a guide rail.
Figure 12:
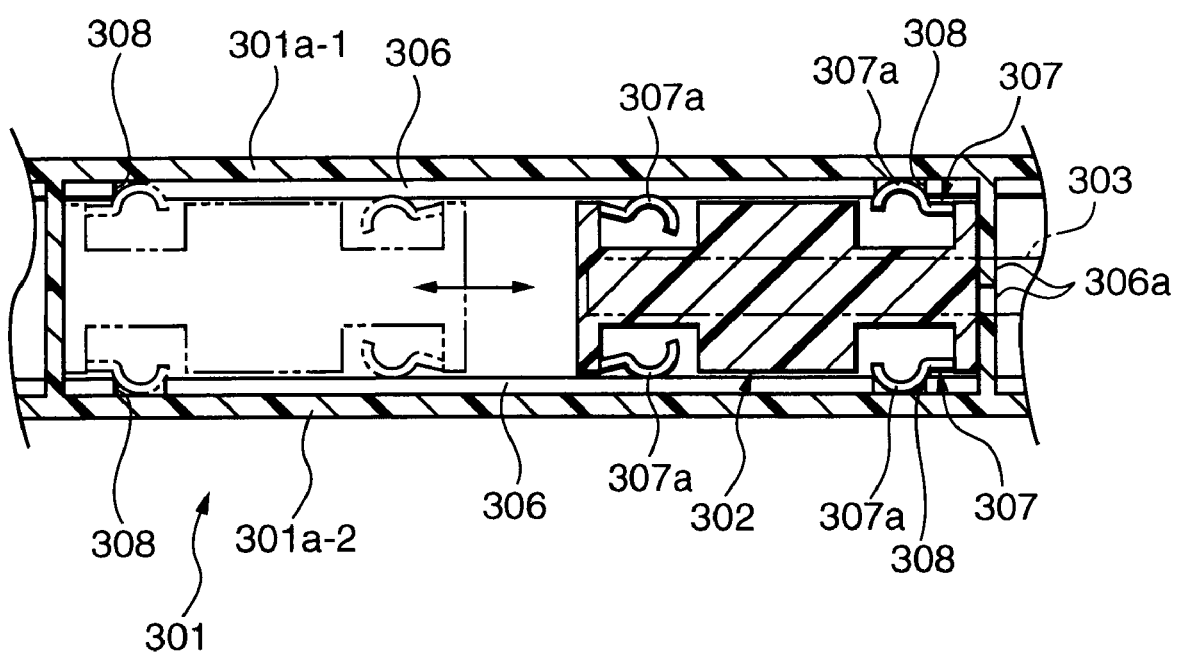
FIG. 12 is a sectional view taken along the line B-B of FIG. 10, depicting a state in which the support is engaged with the guide rail, whereby the sun visor body is positionally restrained relative to the shaft.

Next, a third embodiment of the vehicle-mountable sun visor of the present invention will be described, referring to FIGS. 8 to 12. FIG. 8 is a sectional front view depicting part of a sun visor body in a vehicle-mountable sun visor according to the third embodiment of the present invention; FIG. 9 is a perspective view depicting an interrelationship between a support and a shaft in FIG. 8; FIG. 10 is a cross section taken along the line A-A of FIG. 8; FIG. 11 is a cross section taken along the line B-B of FIG. 10 in a neutral state in which the support is slidable without being engaged with a guide rail; and FIG. 12 is a cross section taken along the line B-B of FIG. 10, depicting a state in which the support is engaged with the guide rail, and the sun visor body is thereby positioned and restrained relative to the shaft.

In FIG. 8, the vehicle-mountable sun visor in the embodiment includes: a sun visor body 301 which is shaped like a plate, exhibiting a rectangle in order to interrupt the radiated light encountered at a front glass of the vehicle or in the forward or lateral direction of a side glass, and moreover, which is formed in a hollowed shape; a support 302 which is furnished in the sun visor body 301; a shaft 303, one end of which is turnably inserted into the support and is formed to be bent in a substantial L-shape; and a bracket 304 for mounting the other end of the shaft 303 to a vehicle body side (not shown), wherein the bracket 304 turnably supports the shaft 303, and the shaft 303 turnably supports the sun visor body 301.

As is clearly shown in FIG. 10, the sun visor body 301 is constituted by covering a sun visor skin 301b such as a woven cloth, a non-woven cloth, or a PVC sheet, on an external surface of a respective one of resin core members 301a-1 and 301a-2 made of a material such as a bead foam. As described later in detail, the sun visor body 301 is constituted by superimposing and assembling a pair of resin core members 301a-1, 301a-2 in a hollowed shape.

The support 302 furnished in the sun visor body 301 is made up of a resin mold obtained by a synthetic resin such as polyacetal (POM) by means of ejection-molding. It is also made of a cylindrical bearing portion 302a and a plate-shaped mount portion 302b. At the bearing portion 302a, a bearing hole 302a-1 is provided with one end of the shaft 303 being turnably inserted and borne. This bearing portion is divided into the two columns in front and in the rear, with an opening 302c for inserting a plate spring 305 thereinto being a boundary.

The plate spring 305 is brought into elastic contact with part of a peripheral face at one end of the shaft 303 that is borne on the bearing hole 302a-1, thereby allowing the spring to obtain a turning torque exerted when the sun visor body 301 is operated to be turned by three turns of the shaft.

The resin core members 301a-1, 301a-2 are shaped like a shell, and form the hollowed sun visor body 301 by superimposing and assembling them, whereas their curved exterior faces are oriented to the outside.

The resin core members 301a-1, 301a-2 are assembled with each other by means of an engagingly fitting action between engagingly fitting claws (not shown) which are provided at the resin core members 301a-1 and 301a-2 with each other.

Further, a pair of guide rails 306, 306 are formed in a protrusive shape, respectively, as shown in FIG. 8, for example, on both or either of the upper and lower interior walls of the resin core members 301a-1, 301a-2 constituting the sun visor body 301. The guide rails 306, 306 are disposed to extend longitudinally of the resin core member 301a-1 in a state in which the rails are spaced from each other. As shown in FIG. 8, further, these guide rails are reinforced by means of ribs 306a which are protruded at the resin core members 301a-1, 301a-2.

The support 302 is slidably interposed longitudinally of the sun visor body between the guide rails 306 and 306.

As is clearly shown in FIGS. 9 and 11, on a pair of side walls 302-1 opposite to the guide rails 306, 306 in the support 302, engagement pieces 307 made up of spring pieces are formed in a state in which the engagement pieces 307 are spaced from each other by one pair, and a respective one of the engagement pieces 307 includes a curved engagement piece part 307a which is outwardly formed in a curved shape and is elastically deformable.

A respective one of the curved engagement piece parts 307a is provided so as to be always in contact with the internal wall face of a respective one of the guide rails 306, 306.

At both ends of guide rails 306, 306, engagement recesses 308 constituting engagement portions are formed so that curved engagement pieces 307a are engaged with each other in order to positionally restrain the sun visor body 301.

With this structure, as shown in FIG. 12, the support 302 slides between the guide rails 306 and 306, the sun visor body 301 slidably moves on the shaft 303, and is thereby shifted to one end of the shaft 303, for example, the position at which the shaft 303 has been pulled out from the sun visor body 301 (the site indicated by the solid-line shown in FIG. 12). In this case, a curved engagement piece 307a of one engagement piece 307 is opposed to the other engagement recess 308. At this time, the curved engagement piece portion 307a is engaged into the other engagement recess 308 by means of the biasing force of the engagement piece 307. Further, the sun visor body 301 is positionally restrained on the shaft 303, and a displacement exerted by the vibration of a moving vehicle never occurs with the sun visor body 301, thus allowing the sun visor to always reliably interrupt irradiating light such as sunlight or headlight of an oncoming vehicle.

Similarly, the sun visor body 301 slidably moves on the shaft 303 in a direction opposite to the aforementioned one, and the body is thereby shifted to the other end of the shaft 303, for example, the position at which the shaft 303 has been accommodated in the sun visor body 301 (the site indicated by the double chain-line of FIG. 12). In this case, the curved engagement piece portion 307a of the other engagement 307 is opposed to the other engagement recess 308. At this time, the curved engagement piece portion 307a is engaged into the other engagement recess 308 by means of the biasing force of the other engagement piece 307. Further, the sun visor body 301 is positionally restrained on the shaft 303, and a displacement exerted by the vibration of a moving vehicle never occurs with the sun visor body 301, thus allowing the sun visor to always reliably interrupt irradiating light such as sunlight or headlight of an oncoming vehicle.

In addition, the engagement recesses 308, with which the curved engagement piece portions 307a of the engagement pieces 307 are to be engaged, are formed at both ends of the guide rails 306, 306, respectively. The positioning locations of the sun visor body 301 relative to the shaft 303 are thereby determined at both ends of the shaft 303, thus allowing the sun visor to ensure the light interruption range of the sun visor body 301 to the maximum, through the use of elongated dimensional full length of the shaft 303.

Next, a modification of the sun visor of the third embodiment according to the present invention will be described, referring to FIGS. 13 and 14.

Figure 13:
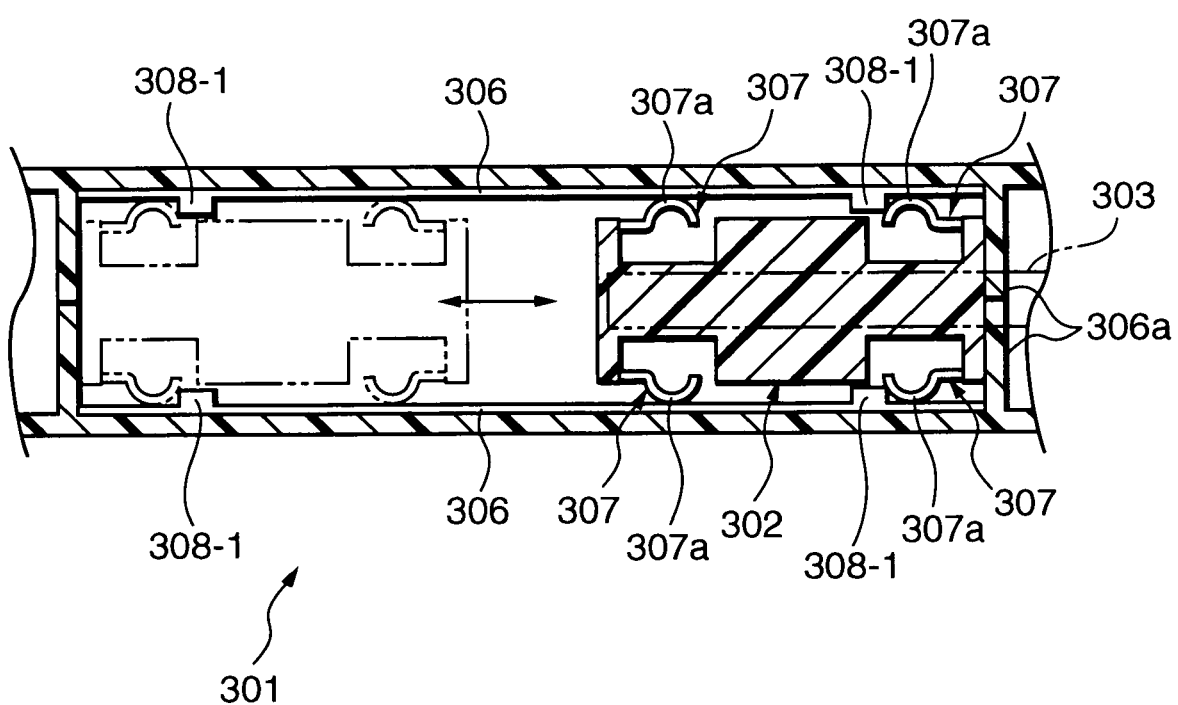
FIG. 13 is a sectional view similar to FIG. 12 in a vehicle-mountable sun visor in a modification of the third embodiment according to the present invention.

A modification of the sun visor of the present invention shown in FIG. 13 has a structure similar to the aforementioned one, except that a pair of engagement protrusions 308-1 is formed in a state in which they are spaced from each other, at both ends of the opposite interior walls of the guide rails 306, 306, in lieu of the abovementioned engagement recesses 308, thereby constituting an engagement portion.

Therefore, according to the modification, the support 302 slides between the guide rails 306 and 306, the sun visor body 301 slidably moves on the shaft 303, and the body is thereby shifted to one end of the shaft 303, for example, the position at which the shaft 303 has been pulled out from the sun visor body 301 (the site indicated by the solid-line shown in FIG. 13). In this case, the curved engagement piece portion 307a of one engagement piece 307 climbs over one engagement protrusion 308-1 while the piece portion is elastically deformed. At this time, the curved engagement portion 307a of one engagement piece 307 abuts against one engagement protrusion 308-1, and is thereby engaged, the sun visor body 301 is positionally restrained on the shaft 303, and a displacement exerted by the vibration of a moving vehicle occurs with the sun visor body 301, thus allowing the sun visor to always reliably interrupt irradiating light such as sunlight or headlight of an oncoming vehicle.

Similarly, the sun visor body 301 slidably moves on the shaft 303 in a direction opposite to the aforementioned one, and the body is thereby shifted to the other end of the shaft 303, for example, the position at which the shaft 303 has been accommodated in the sun visor body 301 (the site indicated by the double chain-line of FIG. 13). In this case, the curved engagement piece portion 307a of the other engagement piece 307 climbs over one engagement protrusion 308-1 while the piece portion is elastically deformed. At this time, the curved engagement piece portion 307a of the other engagement piece 307 abuts against the other engagement protrusion 308-1, and is thereby engaged. Further, the sun visor body 301 is positionally restrained on the shaft 303, and displacement exerted by the vibration of a moving vehicle never occurs with the sun visor body 301, thus allowing the sun visor to always reliably interrupt irradiating light such as sunlight or headlight of an oncoming vehicle.

The engagement recesses 308, with which the curved engagement piece portions 307a of the engagement pieces 307 are to be engagingly fitted or engaged, are formed at both ends of the guide rails 306, 306, respectively. The positioning locations of the sun visor body 301 relative to the shaft 303 are thereby determined at both ends of the shaft 303, thus allowing the sun visor to ensure the light interruption range of the sun visor body 301 to the maximum, through the use of elongated dimensional full length of the shaft 303.

Figure 14:
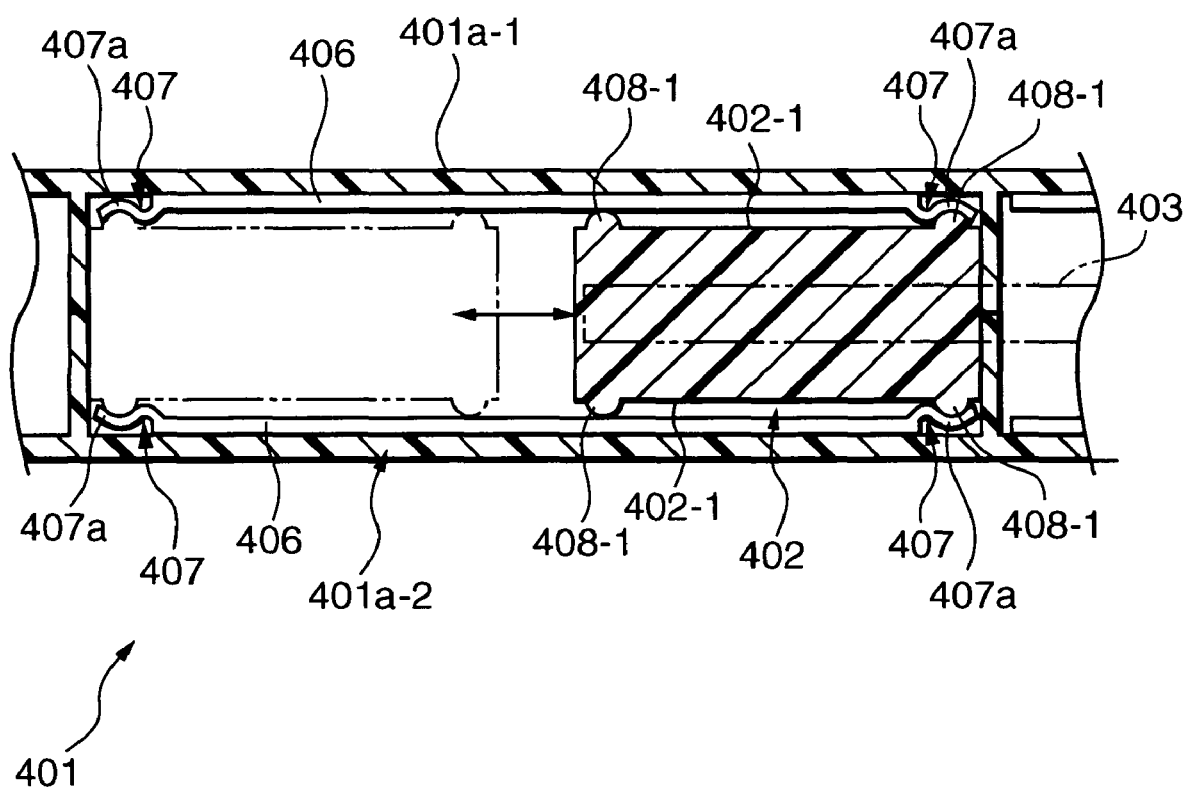
FIG. 14 is a sectional view similar to FIG. 12 in a vehicle-mountable sun visor in a modification of the third embodiment according to the present invention.

A sun visor body 401 shown in FIG. 14 has a structure similar to that described above, except that: engagement pieces 407 are formed at both ends of the opposed interior walls of the guide rails 406, 406, respectively; and a pair of engagement protrusions 408-1 constituting engagement portions are formed in a state in which they are spaced from each other at a pair of side walls 402-1 opposed to the guide rails 406, 406.

Therefore, according to the third embodiment of the present invention, a support 402 is slid between the guide rails 406 and 406, and the sun visor body 401 slidably moves on a shaft 403, and the body is thereby shifted to one end of the shaft 403, for example, the position at which the shaft 403 has been pulled out from the sun visor body (the site indicated by the solid line shown in FIG. 14). In this case, among a pair of engagement protrusions 408-1 formed at the support 402, one engagement protrusion 408-1 is engaged in a state in which the protrusion is elastically biased at the curved engagement piece portion 407a of the engagement piece 407. At this time, the sun visor body 401 is positionally restrained on the shaft 403, and a displacement exerted by the vibration of a moving vehicle never occurs with the sun visor body 401, thus allowing the sun visor to always reliably interrupt sunlight or headlight of an oncoming vehicle.

Similarly, the sun visor body 401 slidably moves on the shaft 403 in a direction opposite to the aforementioned one, and is shifted to the other end of the shaft 403 for example, the position at which the shaft 403 has been accommodated in the sun visor body 401 (the site indicated by the double chain-line of FIG. 14). In this case, among a pair of engagement protrusions 408-1 formed on the support 402, the other engagement protrusion 408-1 is engaged in a state in which it is elastically biased on the curved engagement piece portion 407a of the engagement piece 407. At this time, the sun visor body 401 is positionally restrained on the shaft 403, and a displacement exerted by the vibration of a moving vehicle never occurs with the sun visor body 401, thus allowing the sun visor to always reliably interrupt sunlight or headlight of an oncoming vehicle.

The engagement protrusions 408-1, with which the curved engagement piece portions 407a of the engagement pieces 407 are to be engagingly fitted or engaged, are formed at both ends of the guide rails 406, 406, respectively. The positioning locations of the sun visor body 401 relative to the shaft 403 are thereby determined at both ends of the shaft 403, thus allowing the sun visor to ensure the light interruption range of the sun visor body 401 to the maximum, through the use of an elongated dimensional full length of the shaft 403.

According to the present invention, the engagement piece 407 is provided at the support 402 and the engagement recess 408 or the engagement protrusion 408-1 constituting an engagement portion are provided at both of the guide rails, and in turn, the engagement protrusion 408-1 constituting an engagement portion is provided at the support 402 and engagement pieces are provided at the guide rails 406, 406, thus allowing for positional restraint on the shaft 403 of the sun visor body. Therefore, by constituting the positioning mechanism of the sun visor body 401, any of the above engagement piece and portions can be appropriately selected so as to be adaptable to the entire shape of the sun visor.

Figure 15:
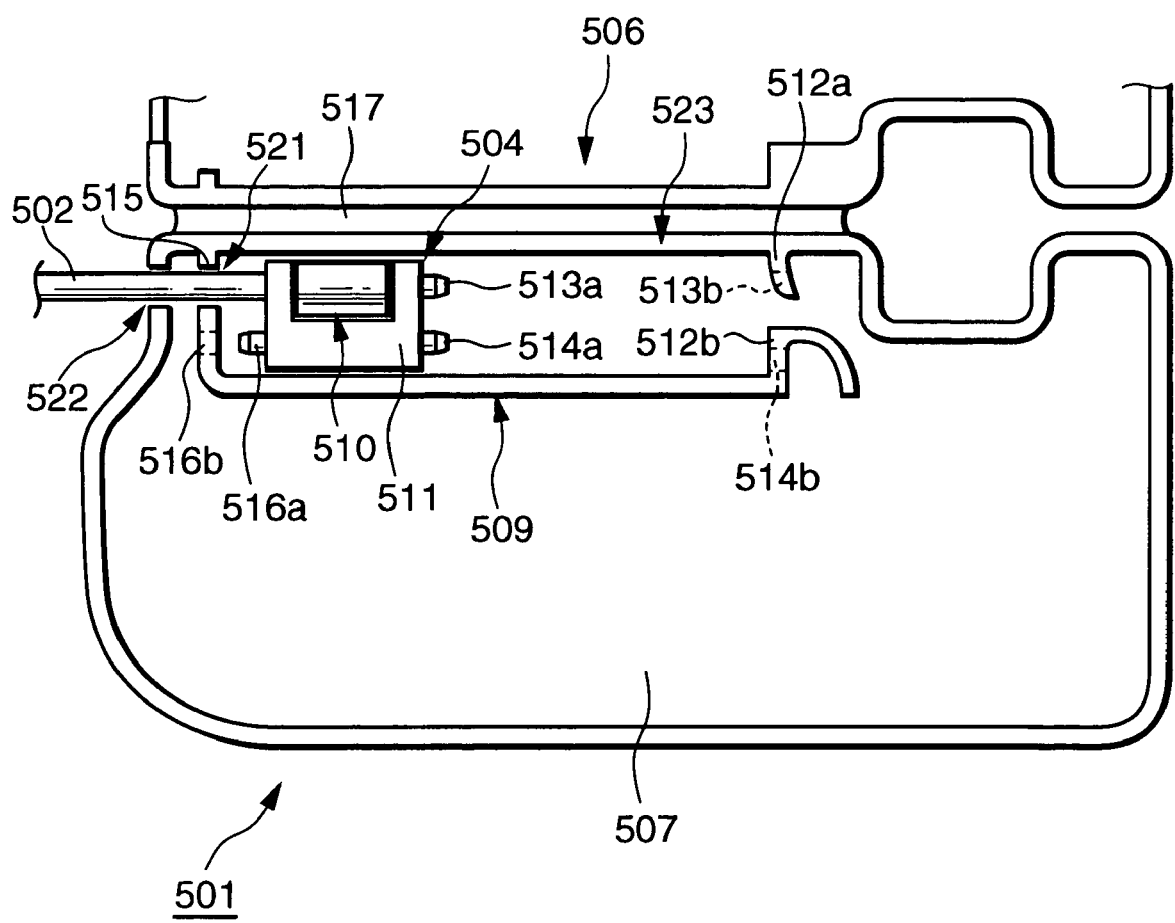
FIG. 15 is a schematic view showing a vehicle-mountable sun visor according to a fourth embodiment of the present invention.

Next, a fourth embodiment of the vehicle-mountable sun visor of the present invention will be described, referring to FIGS. 15 to 18. FIG. 15 is a schematic view showing an internal structure of a sun visor body 501 which is disposed at a resin core member 507 in a state in which resin core members 506 and 507 are opened. The resin core members 506 and 507 are shaped like a shell, an internal face of which is concave. These members are folded thereon around a hinged portion 517, thereby constituting a hollowed sun visor body. A rib 509 serving as a slide guide is provided at a respective one of the resin core members 506, 507. An interior wall 515 defining a position of a support 504 in a case where a shaft 502 is extended, and a rib 512a thickly provided to restrain a position of the support 504 in a case where the shaft is accommodated, are integrally formed at both ends of the rib 509.

The interior wall 515 serves as a second lock portion, an opening 521 is provided for ensuring communication with a shaft 502 through an opening 522 at an outer edge. On the other hand, the rib 512a serves as a first lock portion, whereas it is paired with an interior wall 512b provided at the outer edge 523. The rib 512a and the interior wall 512b are provided separately from each other to obtain a space therebetween, and route an electrical wire to a mirror unit (not shown), whereas it is evident that a respective one of these thick portions serves as a one-piece wall to restrain the position of the support 504.

The rib 509 and the outer edge 523 form an interior wall defining a hollow portion provided inside of the sun visor body 501. Further, the support 504 that is mounted on an end of the shaft 502 is slidably disposed in the hollow portion, and is then encapsulated in the sun visor body 501 by the resin core members 506, 507 being folded around a hinge 517. The shaft 502 is turnably mounted in a vehicle panel at the other end, and the sun visor body 501 slides along the shaft 502. At this time, the support 504 moves the inside of the hollow portion along the rib 509 serving as a slide guide.

In a case where the sun visor body 501 slides in a direction in which it extents along the shaft 502, the support 504 that is mounted at an end of the shaft 502 can slide to a position abutting against an interior wall 515 as the second lock portion. On the other hand, in a case where the support slides in a direction of housing the shaft 2 in the sun visor body 501, the support 504 can slide to a position at which it abuts against the rib 512a, the interior wall 512b as the first lock portion.

At the support 504, a protrusion 516a is provided on a side face through which the shaft 502 passes, and protrusions 513a and 514a are provided on a side face opposite thereto. The protrusion 516a is engaged with the engagement hole 516b provided on the interior wall 515, when the sun visor body 501 slides in a direction in which the body extends, and thereafter, the support 504 abuts against the interior wall 515. On the other hand, the protrusions 513a, 514a are engaged with the engagement holes 514b, 513b that are provided at the rib 512a, the interior wall 512b, when the sun visor body 501 slides in a direction in which the body is accommodated, and thereafter, the support 504 abuts against the rib 512a, the interior wall 512b.

The support 504 has a structure that a U-shaped body 511 and a spring member 510 are combined with each other, and a combination thereof is attached to an end of the shaft 502. Further, the support body 511 is turnably attached around the shaft 502. In this manner, the sun visor body that is supported by the support 504 can also be turned around the shaft 502. Furthermore, the spring member 510 serves to bias the shaft 502 by means of an elastic force, and hold the sun visor body 501 at any turning position.

As described above, the support 504 is an essential member which serves to support the sun visor body 501, slide the body along the shaft 502, and turn the sun visor body 501 around the shaft 502, and which is adapted to bring about functionality of a slidable sun visor.

Figure 16:
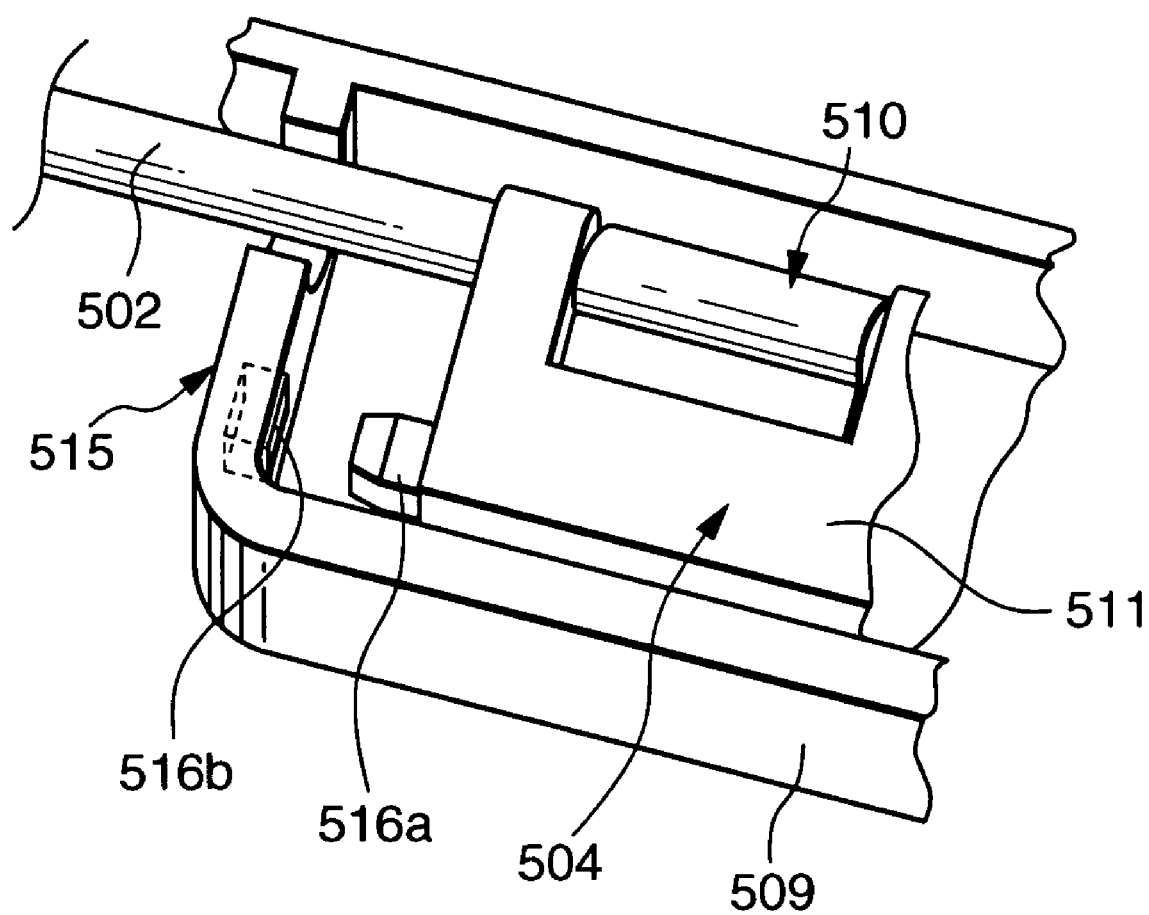
FIG. 16 is a schematic view showing a second lock portion of the vehicle-mountable sun visor according to the present invention.

FIG. 16 is a schematic view showing a state in which the support 504 abuts against the interior wall 515 when the sun visor body 501 slides in a direction in which the body extends. The shaft 502 is pulled out in response to sliding of the sun visor body 501, and a side face of the support 504, through which the shaft 502 passes, abuts against the interior wall 515. At this time, a protrusion 516a which is provided on a side face of the support 504 is engaged with an engagement hole 516b which is provided on the interior wall 515. By means of this engagement, the sun visor body 501 is held on the support 504, stabilizing the posture relative to the shaft 502.

FIG. 16 shows the interior wall 515 that is provided at the resin core member 507. Although not shown, an interior wall corresponding thereto is provided at the resin core member 506 as well. In a case where the resin core members 506 and 507 are folded on each other, these interior walls abut against each other, constituting a one-piece wall, and in turn, constituting the second lock portion. While one protrusion is shown in the figure, a plurality of protrusions and a plurality of engagement holes corresponding thereto may be provided. In this case, it is preferable that the plurality of engagement holes is provided at either one of the resin core members. This is because engagement cannot be established among a plurality of protrusions which are provided on the support 504, owing to a displacement exerted when the resin core members 506, 507 are superimposed on each other.

Figure 17:
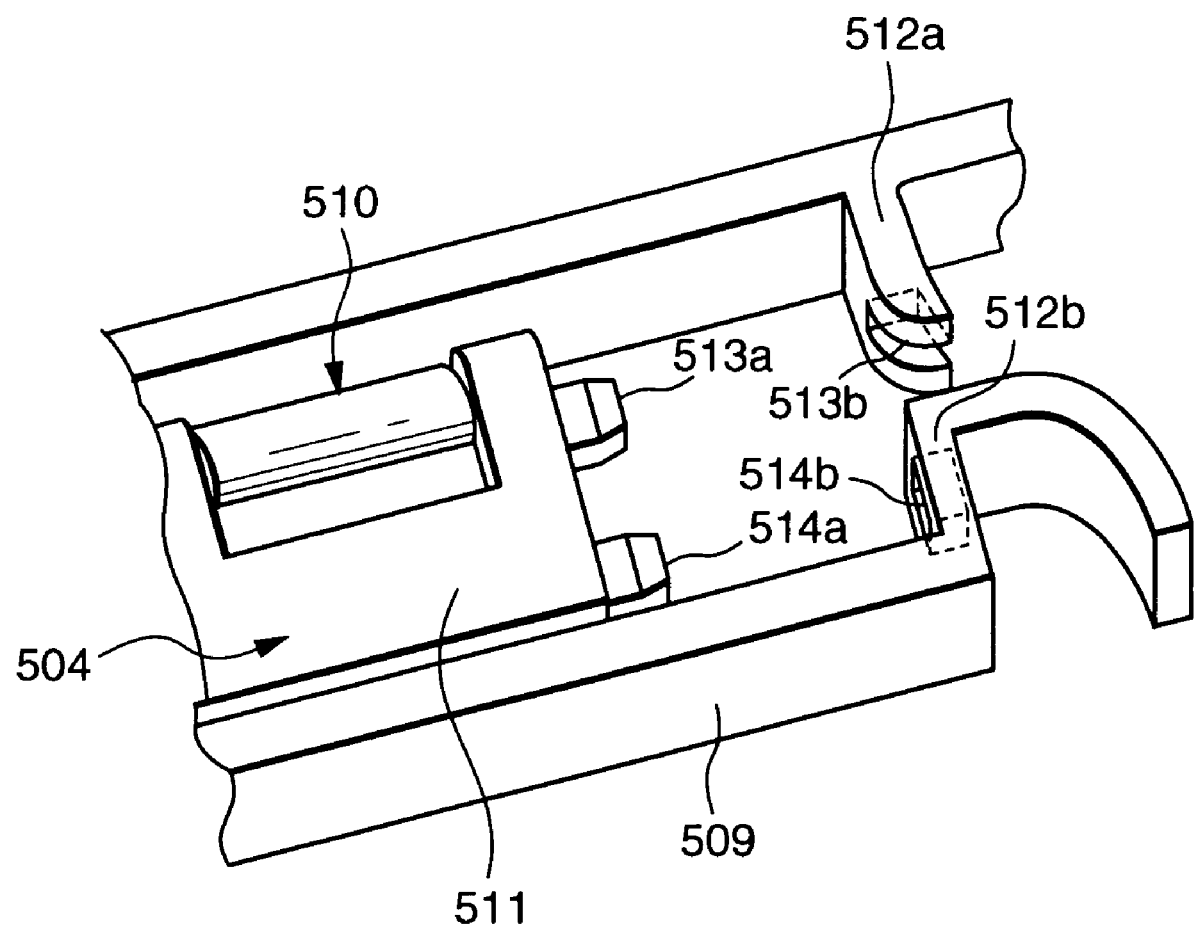
FIG. 17 is a schematic view showing a first lock portion of the vehicle-mountable sun visor according to the present invention.

FIG. 17 is a schematic view showing a state in which the support 504 abuts against the interior walls 512a, 512b at the time of sliding the shaft 502 in a direction in which the shaft 502 is accommodated in the sun visor body 501. Two protrusions 513a, 514a, each of which is provided on a side face of the support 504, are engaged with: an engagement hole 513b, which is provided at the interior wall 512a; and an engagement hole 514b, which is provided at the interior wall 512b, and further, the sun visor body 501 is held by the support 504. In this case, as described previously, it is preferable that the engagement holes 513b and 514b are provided at the same resin core member side.

Figure 18:
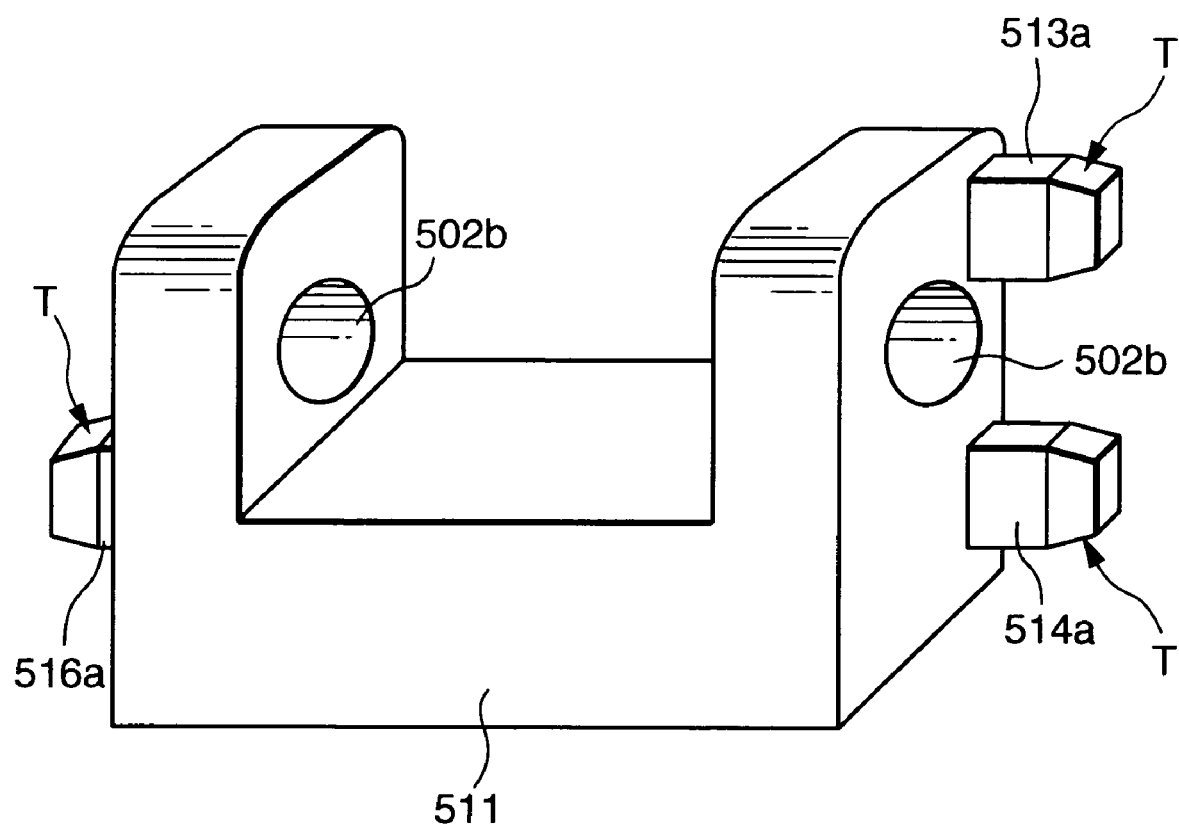
FIG. 18 is a schematic view showing a support of the vehicle-mountable sun visor according to the present invention.

FIG. 18 is a perspective view schematically showing a support body 511. The support body 511 is formed in a U-shape in which an attachment portion of a spring 510 is provided therebetween. In addition, an opening 502b for inserting the shaft 502 thereinto is provided through a side face. Further, the protrusions 513a and 514a, 516a are provided on both of the side faces. A tip end of a respective one of the protrusions is processed in a tapered shape T so as to facilitate engagement with the engagement holes 513b and 514b, 516b that are provided at the first and second lock portions.

While the protrusions in the figure are shaped like a square, they may be formed in any shape such as a circle or a polygon without being limitative thereto. While the protrusions and engagement holes may be engagement such that insertion and extraction can be arbitrarily performed, they can be removably engagingly fitted. In other words, the sizes of the protrusions and engagement holes can be designed to an extent such that they have a suitable insertion resistance, and the sun visor body can be thereby locked with the support 504. In this manner, the sun visor body can be fixed at both ends, as long as the body is in its slidable range. In other words, the sun visor body can be fixed at a position, at which the body slides most extensively, and at a position, at which the shaft 502 is completely accommodated in the body, thus allowing the sun visor to enhance convenience.

Further, in order for the sun visor body 501 to smoothly slide along the shaft 502, it is further preferable that the support 504 is slidable in a hollow portion surrounded by the resin core members 506, 507 and a rib 509 as a slide guide, and is held with a clearance to an extent such that the support does not move in a direction vertical to the sliding direction. Further, presupposing that the sun visor body 501 is used after set at a suitable position taken along the shaft 502, the support 504 is attached so as to have a sliding resistance to an extent such that a displacement exerted by the vibration of a moving vehicle does not occur.

Even in a sun visor in which the support 504 is disposed after adjusted so as to have the abovementioned characteristics in a hollow portion which is surrounded by the resin core members 506, 507 and the rib 509, in a case where a vehicle compartment becomes hot, the temperature of the sun visor body rises, and the resin core members 506, 507 expand, the sliding resistance of the support 504 is reduced, and in turn, the sun visor body 501 slides due to slight vibration.

In a vehicle-mountable sun visor according to the present invention, as described previously, the protrusion 516a or the protrusions 513a, 514a provided at the support 504 are engaged with the engagement hole 516b or the engagement holes 513b, 514b, at least at a position at which the sun visor slides with the longest distance in a extension direction or with the shortest distance in an accommodation direction, and the sun visor body is held in a stable state. Therefore, even under a hot environment, the vehicle-mountable sun visor never degrades its functionality.

While the preferred embodiments of the present invention were described in detail hereinbefore, a vehicle-mountable shield member according to the present invention is not limitative to the above-described examples, and various modifications and alterations can occur without departing from the spirit of the claimed invention. The abovementioned embodiments of the present invention can also be selectively combined with each other.

What is claimed is:

1. A vehicle-mountable sun visor, comprising:
    a shaft, one end of which is mounted on a vehicle body;
    a support mounted on the shaft;
    a sun visor body in which two resin core members are coupled with each other by a hinged portion and the two resin core members are folded with the hinged portion being a fold so as to involve an other end of the shaft and the support;
    a first slide guide provided in proximity to the hinged portion, for guiding sliding of the support; and
    a second slide guide provided on an internal face of one resin core member of the two resin core members, for guiding sliding of the support,
    wherein the support is slidably held in a space surrounded by the folded two resin core members, the first slide guide, and the second slide guide,
    wherein the support turns around the shaft, whereby the sun visor body turns,
    wherein the support slides along the two resin core members, the first slide guide, and the second slide guide, whereby the sun visor body slides relative to the shaft, and
    wherein the second slide guide is extended from the internal face of said one resin core member and has a width to an extent such that an entire bottom face of the support can abut against the slide guide, and
    wherein the sun visor further includes an engagement portion for engagingly fixing an open end of the second slide guide at an internal face side of an other resin core member of the two resin core members opposed to the resin core member at which the second slide guide is provided.

2. The vehicle-mountable sun visor according to claim 1, wherein the first slide guide comprises a protrusion provided along the hinged portion on the interior face of one of the two resin core members, and which covers a step height arising at the hinged portion by the two resin core members being folded on each other.

3. The vehicle-mountable sun visor according to claim 2, wherein, the protrusion of the first slide guide abuts against one of the resin core members on which the protrusion of the hinged portion is not provided, to restrain a bending width of the hinged portion so as to ensure that no displacement occurs at a site in which the two resin core members are folded in abutment.

4. The vehicle-mountable sun visor according to claim 1, wherein the engagement portion includes:
    a protrusion provided at the internal face side of the other resin core member, the protrusion against which the open end face of the second slide guide abuts; and
    a support rib provided at the internal face side of the other resin core member, the support rib supporting the second slide guide while engaging with an open end side of the second slide guide.

5. The vehicle-mountable sun visor according to claim 1, wherein the engagement portion includes a plurality of ribs or protrusions which are provided at the internal face side of the other resin core member and with which the open end of the second slide guide engages.

6. The vehicle-mountable sun visor according to claim 1, wherein the engagement portion includes:
    an engagement claw provided at the open end of the second slide guide; and
    an engagement hole provided at the internal face side of the other resin core member, the engagement hole with which the engagement claw of the second slide guide engages.

7. The vehicle-mountable sun visor according to claim 1, wherein the engagement portion includes:
    an engagement hole which is provided in the second slide guide;
    a screw hole provided in the other resin core member; and
    a screw inserted through the screw hole, the screw engaging with the engagement hole.

8. The vehicle-mountable sun visor according to claim 1, wherein the first slide guide and the second slide guide extend from the internal face side of said one resin core member of the two resin core members.

9. A vehicle-mountable sun visor comprising:
    a shaft, one end of which is mounted on a vehicle body;
    a support mounted on the shaft;
    a sun visor body in which two resin core members are coupled with each other by a hinged portion and the two resin core members are folded with the hinged portion being a fold so as to involve an other end of the shaft and the support;
    a first slide guide provided in proximity to the hinged portion, for guiding sliding of the support; and
    a second slide guide provided on an internal face of one resin core member of the two resin core members, for guiding sliding of the support,
    wherein the support is slidably held in a space surrounded by the folded two resin core members, the first slide guide, and the second slide guide,
    wherein the support turns around the shaft, whereby the sun visor body turns;
    wherein the support slides along the two resin core members, the first slide guide, and the second slide guide, whereby the sun visor body slides relative to the shaft, and
    wherein the first slide guide includes a protrusion provided along the hinged portion on an interior face of a resin core member of the two resin core members, and which covers a step height arising at the hinged portion by the two resin core members being folded on each other.

10. The vehicle-mountable sun visor according to claim 9, wherein the second slide guide is extended from an internal face of said one resin core member and has a width to an extent such that an entire bottom face of the support can abut against the slide guide, and wherein the sun visor further includes an engagement portion for engagingly fixing an open end of the second slide guide at an internal face side of an other resin core member of the two resin core members opposed to the resin core member at which the second slide guide is provided.

11. The vehicle-mountable sun visor according to claim 9, wherein the first slide guide is disposed between the hinged portion and the support.

* * * * *